US007585219B2

(12) United States Patent
Randall et al.

(10) Patent No.: US 7,585,219 B2
(45) Date of Patent: Sep. 8, 2009

(54) GAMING DEVICE HAVING A MATCHING SYMBOL GAME

(75) Inventors: Dov L. Randall, Las Vegas, NV (US); David M. Oles, Henderson, NV (US)

(73) Assignee: IGT, Reno, NV (US)

( * ) Notice: Subject to any disclaimer, the term of this patent is extended or adjusted under 35 U.S.C. 154(b) by 218 days.

(21) Appl. No.: 11/214,369

(22) Filed: Aug. 29, 2005

(65) Prior Publication Data

US 2006/0068883 A1 Mar. 30, 2006

Related U.S. Application Data

(60) Provisional application No. 60/615,133, filed on Sep. 30, 2004.

(51) Int. Cl.
*A63F 9/24* (2006.01)
*A63F 13/00* (2006.01)

(52) U.S. Cl. .............................. 463/20; 463/25; 463/16; 463/17; 463/18

(58) Field of Classification Search ..................... 463/1, 463/16–22, 40, 42
See application file for complete search history.

(56) References Cited

U.S. PATENT DOCUMENTS 3,831,172 A 8/1974 Olliges et al.
3,834,712 A 9/1974 Cox
4,184,683 A 1/1980 Hooker
4,300,225 A 11/1981 Lambl
4,314,236 A 2/1982 Mayer et al.
4,339,798 A 7/1982 Hedges et al.
4,344,345 A 8/1982 Sano
4,363,482 A 12/1982 Goldfarb (Continued)

FOREIGN PATENT DOCUMENTS

EP 0 945 837 A2 9/1999

(Continued)

OTHER PUBLICATIONS

Andy Capp Article, written by Strictly Slots, published in Feb. 2002.

(Continued)

*Primary Examiner*—John M. Hotaling, III
*Assistant Examiner*—Steven J. Hylinski
(74) *Attorney, Agent, or Firm*—K&L Gates LLP

(57) ABSTRACT

A gaming device including a matrix having a plurality of positions defining at least one row and at least one column. The matrix includes a plurality of independently operable symbol generators where each of the positions of the matrix includes at least one of the independently operable symbol generators. Each of the symbol generators include a plurality of symbols. The gaming device enables the player to purchase or activate one or more of the symbols based on a wager made by the player. After the player makes a wager the gaming device activates the designated symbols based on the wager made by the player. The gaming device then causes the symbol generators to each generate symbols in the game. The gaming device evaluates the purchased or activatable symbols generated by the symbol generators in the matrix and provides an award to the player for any winning symbol combinations including the purchased or activated symbols displayed by the symbol generators in the matrix.

46 Claims, 21 Drawing Sheets

| WAGER AMOUNT (CREDITS) | SYMBOL(S) |
|---|---|
| 1 | A |
| 2 | A,B |
| 3 | A,B,C |
| 4 | A,B,C,D |
| 5 | A,B,C,D,E |
| 10 | A,B,C,D,E + SCATTER SYMBOL |
| 20 | A,B,C,D,E + SCATTER SYMBOL + WILD SYMBOL + PROGRESSIVE JACKPOT |

U.S. PATENT DOCUMENTS

| | | | |
|---|---|---|---|
| RE31,441 | E | 11/1983 | Nutting et al. |
| 4,496,149 | A | 1/1985 | Schwartzberg |
| 4,582,324 | A | 4/1986 | Koza et al. |
| 4,618,150 | A | 10/1986 | Kimura |
| 4,624,459 | A | 11/1986 | Kaufman |
| 4,648,600 | A | 3/1987 | Olliges |
| 4,660,107 | A | 4/1987 | Chippendale, Jr. |
| 4,695,053 | A | 9/1987 | Vazquez, Jr. et al. |
| 4,712,189 | A | 12/1987 | Mohri |
| 4,732,386 | A | 3/1988 | Rayfiel |
| 4,733,593 | A | 3/1988 | Rothbart |
| 4,791,558 | A | 12/1988 | Chaitin et al. |
| 4,876,937 | A | 10/1989 | Suzuki |
| 4,961,575 | A | 10/1990 | Perry |
| 4,974,483 | A | 12/1990 | Luzzatto |
| 4,974,857 | A | 12/1990 | Beall et al. |
| 5,046,735 | A | 9/1991 | Hamano et al. |
| 5,096,195 | A | 3/1992 | Gimmon |
| 5,119,465 | A | 6/1992 | Jack et al. |
| 5,163,131 | A | 11/1992 | Row et al. |
| 5,179,517 | A | 1/1993 | Sarbin et al. |
| 5,221,801 | A | 6/1993 | Bruti et al. |
| 5,223,828 | A | 6/1993 | McKiel, Jr. |
| 5,242,163 | A | 9/1993 | Fulton |
| 5,258,574 | A | 11/1993 | Kawano |
| 5,265,877 | A | 11/1993 | Boylan et al. |
| 5,266,736 | A | 11/1993 | Saito |
| 5,275,400 | A | 1/1994 | Weingardt et al. |
| 5,287,102 | A | 2/1994 | McKiel, Jr. |
| 5,331,112 | A | 7/1994 | Sato et al. |
| 5,342,047 | A | 8/1994 | Heidel et al. |
| 5,371,345 | A | 12/1994 | LeStrange et al. |
| 5,390,938 | A | 2/1995 | Takeya |
| 5,393,061 | A | 2/1995 | Manship et al. |
| 5,393,070 | A | 2/1995 | Best |
| 5,429,507 | A | 7/1995 | Kaplan |
| 5,430,835 | A | 7/1995 | Williams et al. |
| 5,446,902 | A | 8/1995 | Islam |
| 5,449,173 | A | 9/1995 | Thomas et al. |
| 5,469,511 | A | 11/1995 | Lewis et al. |
| 5,470,233 | A | 11/1995 | Fruchterman et al. |
| 5,472,197 | A | 12/1995 | Gwiasda et al. |
| 5,508,699 | A | 4/1996 | Silverman |
| 5,515,764 | A | 5/1996 | Rosen |
| 5,547,201 | A | 8/1996 | Honeywill |
| 5,577,253 | A | 11/1996 | Blickstein |
| 5,580,053 | A | 12/1996 | Crouch |
| 5,606,144 | A | 2/1997 | Dabby |
| 5,611,535 | A | 3/1997 | Tiberio |
| 5,625,845 | A | 4/1997 | Allran |
| 5,655,961 | A | 8/1997 | Acres et al. |
| 5,668,996 | A | 9/1997 | Radinsky |
| 5,695,188 | A | 12/1997 | Ishibashi |
| 5,697,843 | A | 12/1997 | Manship et al. |
| 5,702,304 | A | 12/1997 | Acres et al. |
| 5,703,310 | A | 12/1997 | Kurakake et al. |
| 5,704,835 | A | 1/1998 | Dietz, II |
| 5,707,286 | A | 1/1998 | Carlson |
| 5,715,459 | A | 2/1998 | Celi |
| 5,741,183 | A | 4/1998 | Acres et al. |
| 5,745,761 | A | 4/1998 | Celi |
| 5,745,762 | A | 4/1998 | Celi |
| 5,752,882 | A | 5/1998 | Acres et al. |
| 5,758,875 | A | 6/1998 | Giacalone, Jr. |
| 5,762,552 | A | 6/1998 | Vuong et al. |
| 5,766,074 | A | 6/1998 | Cannon et al. |
| 5,769,716 | A | 6/1998 | Saffari et al. |
| 5,772,509 | A | 6/1998 | Weiss |
| 5,778,231 | A | 7/1998 | Van Hoff et al. |
| 5,792,972 | A | 8/1998 | Houston |
| 5,802,364 | A | 9/1998 | Senator |
| 5,807,172 | A | 9/1998 | Piechowiak |
| 5,809,303 | A | 9/1998 | Senator |
| 5,820,459 | A | 10/1998 | Acres et al. |
| 5,823,873 | A | 10/1998 | Moody |
| 5,833,538 | A | 11/1998 | Weiss |
| 5,836,817 | A | 11/1998 | Acres et al. |
| 5,839,958 | A | 11/1998 | Ozarow |
| 5,848,932 | A | 12/1998 | Adams |
| 5,854,927 | A | 12/1998 | Gelissen |
| 5,876,284 | A | 3/1999 | Acres et al. |
| 5,880,386 | A | 3/1999 | Wachi et al. |
| 5,889,990 | A | 3/1999 | Coleman |
| 5,892,171 | A | 4/1999 | Ide |
| 5,902,184 | A | 5/1999 | Bennett et al. |
| 5,908,354 | A | 6/1999 | Okuniewicz |
| 5,910,048 | A | 6/1999 | Feinberg |
| 5,911,071 | A | 6/1999 | Jordan |
| 5,920,720 | A | 7/1999 | Toutonghi |
| 5,920,842 | A | 7/1999 | Cooper et al. |
| 5,923,878 | A | 7/1999 | Marsland |
| 5,923,880 | A | 7/1999 | Rose |
| 5,930,509 | A | 7/1999 | Yates |
| 5,937,193 | A | 8/1999 | Evoy |
| 5,946,487 | A | 8/1999 | Dangelo |
| 5,946,489 | A | 8/1999 | Yellin |
| 5,951,397 | A | 9/1999 | Dickinson |
| 5,964,843 | A | 10/1999 | Eisler |
| 5,966,535 | A | 10/1999 | Benedikt |
| 5,967,894 | A | 10/1999 | Kinoshita et al. |
| 5,970,143 | A | 10/1999 | Schneier et al. |
| 5,970,249 | A | 10/1999 | Holzle |
| 5,978,585 | A | 11/1999 | Crelier |
| 5,980,384 | A | 11/1999 | Barrie |
| 5,997,400 | A | 12/1999 | Seelig et al. |
| 5,997,401 | A | 12/1999 | Crawford |
| 5,999,731 | A | 12/1999 | Yellin |
| 6,003,038 | A | 12/1999 | Chen |
| 6,015,346 | A | 1/2000 | Bennett |
| D421,277 | S | 2/2000 | McGahn et al. |
| 6,019,364 | A | 2/2000 | Svyatsky et al. |
| 6,021,272 | A | 2/2000 | Cahill et al. |
| 6,021,273 | A | 2/2000 | Criesemer |
| 6,026,238 | A | 2/2000 | Bond |
| 6,027,115 | A | 2/2000 | Griswold et al. |
| 6,029,000 | A | 2/2000 | Woolsey |
| 6,031,993 | A | 2/2000 | Andrews |
| 6,033,307 | A | 3/2000 | Vancura |
| 6,035,120 | A | 3/2000 | Ravichandran |
| 6,052,527 | A | 4/2000 | Delcourt et al. |
| 6,056,642 | A | 5/2000 | Bennett |
| 6,059,289 | A | 5/2000 | Vancura |
| 6,062,979 | A | 5/2000 | Inoue |
| 6,066,181 | A | 5/2000 | DeMaster |
| 6,071,192 | A | 6/2000 | Weiss |
| 6,074,432 | A | 6/2000 | Guccione |
| 6,075,940 | A | 6/2000 | Gosling |
| 6,084,169 | A | 7/2000 | Hasegawa et al. |
| 6,089,976 | A | 7/2000 | Schneider et al. |
| 6,089,977 | A | 7/2000 | Bennett |
| 6,089,978 | A | 7/2000 | Adams |
| 6,092,147 | A | 7/2000 | Levy |
| 6,093,102 | A * | 7/2000 | Bennett ...................... 463/20 |
| 6,096,095 | A | 8/2000 | Halstead |
| 6,102,400 | A | 8/2000 | Scott et al. |
| 6,102,798 | A | 8/2000 | Bennett |
| 6,103,964 | A | 8/2000 | Kay |
| 6,106,393 | A | 8/2000 | Sunaga et al. |
| 6,110,041 | A | 8/2000 | Walker et al. |
| 6,110,043 | A | 8/2000 | Olsen |
| 6,110,226 | A | 8/2000 | Bothner |
| 6,113,495 | A | 9/2000 | Walker |
| 6,117,009 | A | 9/2000 | Yoseloff |
| 6,120,031 | A | 9/2000 | Adams |

| | | | | |
|---|---|---|---|---|
| 6,120,378 | A | 9/2000 | Moody et al. | |
| 6,126,165 | A | 10/2000 | Sakamoto | |
| 6,131,191 | A | 10/2000 | Cierniak | |
| 6,138,273 | A | 10/2000 | Sturges | |
| 6,141,794 | A | 10/2000 | Dice | |
| 6,142,875 | A | 11/2000 | Kodachi et al. | |
| 6,146,273 | A | 11/2000 | Olsen | |
| 6,146,276 | A | 11/2000 | Okuniewicz | |
| 6,155,925 | A | 12/2000 | Giobbi et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,162,122 | A | 12/2000 | Acres et al. | |
| 6,174,233 | B1 | 1/2001 | Sunaga et al. | |
| 6,174,235 | B1 | 1/2001 | Walker et al. | |
| 6,175,632 | B1 | 1/2001 | Marx | |
| 6,176,487 | B1 | 1/2001 | Eklund et al. | |
| 6,190,255 | B1 | 2/2001 | Thomas et al. | |
| 6,198,395 | B1 | 3/2001 | Sussman | |
| 6,210,279 | B1 | 4/2001 | Dickinson | |
| 6,217,448 | B1 | 4/2001 | Olsen | |
| 6,227,971 | B1 | 5/2001 | Weiss | |
| 6,233,731 | B1 | 5/2001 | Bond et al. | |
| 6,238,288 | B1 | 5/2001 | Walker et al. | |
| 6,241,612 | B1 | 6/2001 | Heredia | |
| 6,251,013 | B1 | 6/2001 | Bennett | |
| 6,254,481 | B1 | 7/2001 | Jaffe | |
| 6,257,981 | B1 | 7/2001 | Acres et al. | |
| 6,261,178 | B1 | 7/2001 | Bennett | |
| 6,270,411 | B1 | 8/2001 | Gura et al. | |
| 6,270,412 | B1 | 8/2001 | Crawford et al. | |
| 6,290,600 | B1 | 9/2001 | Glasson | |
| 6,293,869 | B1 | 9/2001 | Kwan et al. | |
| 6,295,638 | B1 | 9/2001 | Brown et al. | |
| 6,302,790 | B1 | 10/2001 | Brossard | |
| 6,306,034 | B1 | 10/2001 | Sakamoto et al. | |
| 6,309,299 | B1 | 10/2001 | Weiss | |
| 6,309,301 | B1 | 10/2001 | Sano | |
| 6,311,982 | B1 | 11/2001 | Lebensfeld et al. | |
| 6,319,124 | B1 | 11/2001 | Baerlocher et al. | |
| 6,319,125 | B1 | 11/2001 | Acres | |
| 6,321,323 | B1 | 11/2001 | Nugroho et al. | |
| 6,322,078 | B1 | 11/2001 | Adams | |
| 6,328,648 | B1 | 12/2001 | Walker et al. | |
| 6,331,143 | B1 | 12/2001 | Yoseloff | |
| 6,334,814 | B1 | 1/2002 | Adams | |
| 6,336,860 | B1 | 1/2002 | Webb | |
| 6,346,043 | B1 | 2/2002 | Colin et al. | |
| 6,364,768 | B1 | 4/2002 | Acres et al. | |
| 6,375,568 | B1 | 4/2002 | Roffman et al. | |
| 6,375,569 | B1 | 4/2002 | Acres | |
| 6,386,975 | B1 * | 5/2002 | Peterson | 463/16 |
| 6,390,923 | B1 | 5/2002 | Yoshitomi et al. | |
| 6,409,596 | B1 | 6/2002 | Hayashida et al. | |
| 6,413,162 | B1 | 7/2002 | Baerlocher et al. | |
| 6,416,411 | B1 | 7/2002 | Tsukahara | |
| 6,443,837 | B1 | 9/2002 | Jaffe et al. | |
| RE37,885 | E | 10/2002 | Acres et al. | |
| 6,491,584 | B2 | 12/2002 | Graham et al. | |
| 6,494,454 | B2 | 12/2002 | Adams | |
| 6,494,785 | B1 | 12/2002 | Gerrard et al. | |
| 6,504,089 | B1 | 1/2003 | Negishi et al. | |
| 6,516,466 | B1 | 2/2003 | Jackson | |
| 6,517,432 | B1 | 2/2003 | Jaffe | |
| 6,520,855 | B2 | 2/2003 | DeMar et al. | |
| 6,533,658 | B1 | 3/2003 | Walker et al. | |
| 6,533,660 | B2 | 3/2003 | Seelig et al. | |
| 6,537,152 | B2 | 3/2003 | Seelig et al. | |
| 6,544,122 | B2 | 4/2003 | Araki et al. | |
| 6,551,187 | B1 | 4/2003 | Jaffe | |
| 6,554,703 | B1 | 4/2003 | Bussick et al. | |
| 6,561,908 | B1 | 5/2003 | Hoke | |
| 6,565,434 | B1 | 5/2003 | Acres | |
| 6,565,436 | B1 | 5/2003 | Baerlocher | |
| 6,581,935 | B1 | 6/2003 | Odom | |
| 6,592,457 | B1 | 7/2003 | Frohm et al. | |
| 6,599,195 | B1 | 7/2003 | Araki et al. | |
| 6,602,136 | B1 | 8/2003 | Baerlocher et al. | |
| 6,604,999 | B2 | 8/2003 | Ainsworth | |
| 6,616,142 | B2 | 9/2003 | Adams | |
| 6,632,139 | B1 | 10/2003 | Baerlocher | |
| 6,634,945 | B2 | 10/2003 | Glavich et al. | |
| 6,638,169 | B2 | 10/2003 | Wilder et al. | |
| 6,656,046 | B1 | 12/2003 | Yoseloff et al. | |
| 6,669,559 | B1 | 12/2003 | Baerlocher et al. | |
| 6,682,073 | B2 | 1/2004 | Bryant et al. | |
| 6,729,618 | B1 | 5/2004 | Koenig et al. | |
| 6,731,313 | B1 | 5/2004 | Kaminkow | |
| 6,739,973 | B1 | 5/2004 | Lucchesi et al. | |
| 6,749,502 | B2 | 6/2004 | Baerlocher | |
| 6,755,738 | B2 | 6/2004 | Glasson et al. | |
| 6,769,985 | B1 | 8/2004 | Laakso et al. | |
| 6,780,109 | B2 | 8/2004 | Kaminkow | |
| 6,805,349 | B2 | 10/2004 | Baerlocher et al. | |
| 6,810,517 | B2 | 10/2004 | Bond et al. | |
| 6,835,132 | B2 | 12/2004 | Bennett | |
| 6,848,996 | B2 | 2/2005 | Hecht et al. | |
| 6,855,053 | B2 | 2/2005 | Baerlocher | |
| 6,866,583 | B2 | 3/2005 | Glavich et al. | |
| 6,878,061 | B2 | 4/2005 | Baerlocher et al. | |
| 6,905,406 | B2 | 6/2005 | Kaminkow et al. | |
| 6,910,962 | B2 | 6/2005 | Marks et al. | |
| 6,921,335 | B2 | 7/2005 | Rodgers et al. | |
| 6,929,952 | B2 | 8/2005 | Baerlocher | |
| 6,935,955 | B1 | 8/2005 | Kaminkow et al. | |
| 6,939,226 | B1 | 9/2005 | Joshi | |
| 6,958,013 | B2 | 10/2005 | Miereau et al. | |
| 6,960,133 | B1 | 11/2005 | Marks et al. | |
| 6,997,808 | B2 | 2/2006 | Rodgers et al. | |
| 7,001,274 | B2 | 2/2006 | Baerlocher et al. | |
| 7,014,560 | B2 | 3/2006 | Glavich et al. | |
| 7,040,983 | B2 | 5/2006 | Dolloff et al. | |
| 7,040,987 | B2 | 5/2006 | Walker et al. | |
| 7,056,209 | B2 | 6/2006 | Baerlocher et al. | |
| 7,059,967 | B2 | 6/2006 | Baerlocher | |
| 7,070,502 | B1 | 7/2006 | Bussick et al. | |
| 7,074,127 | B2 | 7/2006 | Cuddy et al. | |
| 7,090,579 | B2 | 8/2006 | Tarantino | |
| 7,090,580 | B2 | 8/2006 | Rodgers et al. | |
| 7,347,777 | B2 * | 3/2008 | Gauselmann | 463/25 |
| 7,387,570 | B2 | 6/2008 | Randall | |
| 2001/0029542 | A1 | 10/2001 | Nishimura | |
| 2002/0039919 | A1 | 4/2002 | Joshi et al. | |
| 2002/0077165 | A1 | 6/2002 | Bansemer et al. | |
| 2002/0090990 | A1 | 7/2002 | Joshi et al. | |
| 2002/0109718 | A1 | 8/2002 | Mansour et al. | |
| 2003/0027619 | A1 | 2/2003 | Nicastro | |
| 2003/0064771 | A1 | 4/2003 | Morrow et al. | |
| 2003/0064798 | A1 | 4/2003 | Grauzer et al. | |
| 2003/0064801 | A1 | 4/2003 | Breckner et al. | |
| 2003/0064807 | A1 * | 4/2003 | Walker et al. | 463/42 |
| 2003/0064808 | A1 | 4/2003 | Hecht et al. | |
| 2003/0073489 | A1 | 4/2003 | Hecht et al. | |
| 2003/0073490 | A1 | 4/2003 | Hecht et al. | |
| 2003/0073491 | A1 | 4/2003 | Hecht et al. | |
| 2003/0078103 | A1 | 4/2003 | LeMay et al. | |
| 2003/0157981 | A1 | 8/2003 | Marks et al. | |
| 2003/0190945 | A1 | 10/2003 | Bussick et al. | |
| 2003/0203753 | A1 | 10/2003 | Muir et al. | |
| 2003/0224850 | A1 | 12/2003 | Anderson et al. | |
| 2004/0023714 | A1 | 2/2004 | Van Asdale | |
| 2004/0033829 | A1 | 2/2004 | Pacey et al. | |
| 2004/0048646 | A1 | 3/2004 | Visocnik | |
| 2004/0048657 | A1 | 3/2004 | Gauselmann | |
| 2004/0053661 | A1 | 3/2004 | Jones et al. | |
| 2004/0053670 | A1 | 3/2004 | Rothkranz et al. | |

2004/0053676 A1 3/2004 Rodgers
2004/0053677 A1 3/2004 Hughs-Baird
2004/0053695 A1 3/2004 Mattice et al.
2004/0063489 A1 4/2004 Crumby
2004/0067790 A1 4/2004 Peterson et al.
2004/0082373 A1 4/2004 Cole et al.
2004/0097282 A1 5/2004 Baerlocher et al.
2004/0116175 A1 6/2004 Aida
2004/0142739 A1 7/2004 Loose et al.
2004/0142747 A1 7/2004 Pryzby
2004/0209685 A1 10/2004 Lucchesi et al.
2004/0219969 A1* 11/2004 Casey et al. .................. 463/20
2004/0259625 A1 12/2004 Randall
2004/0266520 A1 12/2004 Aida
2005/0003881 A1* 1/2005 Byng .......................... 463/16
2005/0020344 A1 1/2005 Kaminkow
2005/0043090 A1 2/2005 Pryzby et al.
2005/0049035 A1 3/2005 Baerlocher et al.
2005/0049036 A1 3/2005 Mead
2005/0054421 A1 3/2005 Hughs-Baird et al.
2005/0054434 A1 3/2005 Baerlocher et al.
2005/0054440 A1 3/2005 Anderson et al.
2005/0054442 A1 3/2005 Anderson et al.
2005/0064924 A1 3/2005 Glavich et al.
2005/0064926 A1 3/2005 Walker et al.
2005/0064935 A1 3/2005 Blanco
2005/0070354 A1 3/2005 Baerlocher et al.
2005/0101380 A1 5/2005 Glavich et al.
2005/0107154 A1* 5/2005 Pacey .......................... 463/20
2005/0130731 A1 6/2005 Englman et al.
2005/0130737 A1 6/2005 Englman et al.
2005/0143165 A1 6/2005 Berman et al.
2005/0148381 A1 7/2005 Marks et al.
2005/0148384 A1 7/2005 Marks et al.
2005/0176494 A1 8/2005 Thomas
2005/0215311 A1 9/2005 Hornik et al.
2005/0227754 A1 10/2005 Kaminkow et al.
2005/0277469 A1 12/2005 Pryzby et al.
2005/0282620 A1 12/2005 Marks et al.
2005/0282631 A1 12/2005 Bonney et al.
2005/0288094 A1 12/2005 Marks et al.
2006/0030392 A1 2/2006 Rodgers et al.
2006/0030396 A1* 2/2006 Marks et al. .................. 463/20
2006/0030401 A1 2/2006 Mead et al.
2006/0063584 A1 3/2006 Brill et al.
2006/0068875 A1 3/2006 Cregan et al.
2006/0073876 A1 4/2006 Cuddy
2006/0084493 A1 4/2006 Pederson et al.
2006/0084494 A1 4/2006 Belger et al.
2006/0111174 A1 5/2006 Baerlocher et al.
2006/0116195 A1 6/2006 Baerlocher et al.
2006/0135247 A1 6/2006 Baerlocher et al.
2006/0142077 A1 6/2006 Miles et al.
2006/0172795 A1 8/2006 Bussick et al.
2006/0252492 A1* 11/2006 Anderson et al. ............. 463/17
2008/0214292 A1* 9/2008 Bryant et al. ................. 463/25

FOREIGN PATENT DOCUMENTS

EP 1 079 345 A1 2/2001
EP 1 298 601 A2 4/2003
GB 2 372 617 1/2002
WO WO 97/32285 4/1997
WO WO 00/12186 3/2000
WO WO 02/18025 3/2002
WO WO 2004/026417 4/2004
WO 2005/058444 6/2005
WO 2005/079936 9/2005

OTHER PUBLICATIONS

Andy Capp Game Description, written by Bally Gaming Systems, published in 2001.
Article, “Monopoly Movers & Shakers Williams/WMS Gaming,” published by Strictly Slots in Jul. 2000.
Bally Live! Special Global Gaming Expo 2002 Issue, written by Bally Gaming Systems, published in Fall, 2002.
Barroso, Luiz Andre, Susan Iman, Jaeheon Jeong, Korey Oner, and Michel Dubois. “RPM: A Rapid Prototyping Engine for Multiprocessor Systems.” *IEEE Computer*, Feb. 1995, pp. 26-34.
Break the Spell Brochure, written by Atronics, published in 1999.
Boxer, Aaron. “Where Buses Cannot Go.” *IEEE Spectrum*, Feb. 1995, pp. 41-45.
Crazy Fruits Advertisement written by Atronic, published in 2000.
Crazy Fruits Article, written by Strictly Slots, pulished in 2001.
18-Reeler, written by Global Gaming Business, published on Jun. 15, 2003.
18 Reeler, written by IGT, published in 2002.
Enchanted Unicorn—Unicorn Bonus Advertisements, written by IGT, published in 2001.
Geddes, Robert N. *Slot Machines on Parade*. First Edition, The Mead Company, Long Beach, California. pp. 120, 127, 138.
Jackpot Party Brochures and Articles, published by WMS Gaming, Inc., in 1998.
Jazzy Jackpots Advertisements, written by Atronic, published in 2000.
Jazzy Jackpots Article, written by Strictly Slots, published in Mar. 2001.
Leopard Spots, published by IGT in Oct. 1999.
Pink Panther Advertisement and Article, written by IGT, published in 2000.
Reel Power, written by Aristocrat, available prior to Oct. 2005.
Screen Shots of“Race Car Bonus Feature,” written by IGT, available in Dec. 1998.
Slots 2003, written by Melissa Raimondi, published in Jan. 2003.

* cited by examiner

FIG. 3A

| WAGER AMOUNT (CREDITS) | SYMBOL(S) |
|---|---|
| 1 | A |
| 2 | A,B |
| 3 | A,B,C |
| 4 | A,B,C,D |
| 5 | A,B,C,D,E |
| 10 | A,B,C,D,E + SCATTER SYMBOL |
| 20 | A,B,C,D,E + SCATTER SYMBOL + WILD SYMBOL + PROGRESSIVE JACKPOT |

FIG. 3B

| SYMBOL COMBINATION | AWARD (CREDITS) |
|---|---|
| 4 MATCHING SYMBOLS | 6 |
| 5 MATCHING SYMBOLS | 15 |
| 6 MATCHING SYMBOLS | 100 |
| 7 MATCHING SYMBOLS | 1000 |

FIG. 3C

| SYMBOL COMBINATION | AWARD (CREDITS) |
|---|---|
| 4 SCATTER SYMBOLS | 5 BONUS GAMES |
| 5 SCATTER SYMBOLS | 7 BONUS GAMES |
| 6 SCATTER SYMBOLS | 12 BONUS GAMES |

GAMING DEVICE HAVING A MATCHING SYMBOL GAME

PRIORITY CLAIM

This application is a non-provisional application of, claims priority to and the benefit of U.S. Provisional Patent Application No. 60/615,133, filed on Sep. 30, 2004, the entire contents of which are incorporated herein.

BACKGROUND OF THE INVENTION

The present invention relates in general to a gaming device, and more particularly to a gaming device having a matching symbol game which activates one or more symbols in the game based on a wager made by a player.

Contemporary gaming devices such as slot machines often include a primary game and one or more bonus rounds or bonus games. The primary games typically include the generation of one or more symbols using one or more symbol generators. The traditional symbol generators are a set of reels, where each reel has a plurality of symbols. If the player achieves a predetermined combination of symbols on the reels along a payline, the player wins a value. In addition, if the player achieves a bonus triggering event, the gaming device advances the player to a bonus game where the player can accumulate additional values. The traditional bonus triggering event occurs when the player achieves a predetermined symbol along a payline on one of the reels or a predetermined combination of symbols along a payline on a plurality of reels. If the combination of symbols indicated on the reels is not a predetermined symbol or symbol combination, the gaming device does not provide an award to the player.

Conventional games also include matching games. In one such game, the gaming device provides a base and a plurality of selections. The base and each of the selections include a plurality of characteristics. To play the game, the player selects at least one selection that has at least one characteristic that matches one of the characteristics of the base. The game continues as long as the player continues to match characteristics between one of the selections and the base. If the player is unable to make a match, the game terminates or alternatively replaces the selection with new selections. The gaming device provides the player an award based on the number of matches and/or values associated with the matches.

Players are attracted to gaming devices which provide new game schemes including different ways of obtaining winning symbol combinations or different types of triggering events. Therefore, to increase player enjoyment and excitement, it is desirable to provide players with new game schemes for gaming devices which include new and different ways of indicating symbol combinations and triggering events.

SUMMARY OF THE INVENTION

The present invention relates, in general, to a gaming device, and more specifically to a gaming device having a matching symbol game which enables a player to activate one or more symbols in the game based on a wager made by the player and then obtain an outcome based on winning symbol combinations including the activated symbols.

In one embodiment, the gaming device includes a primary game operable upon a plurality of different wagers or different wagerable amounts. The game includes a symbol display, grid or matrix having a plurality of different positions that define at least one column and at least one row, and preferably a plurality of columns and a plurality of rows. In one embodiment, each of the positions in the matrix includes an independently operated symbol generator. The symbol generator may be any suitable symbol display such as a reel, wheel, dice, etc. The symbols may be any suitable symbols such as conventional reel symbols. In this embodiment, the gaming device enables the player to activate or purchase one or more of the symbols of the symbol generators (or one or more sets of the symbols) by enabling the player to enter a wager for the play of the game. The level or amount of the player's wager or wagered amount determines which symbols are activated in the play of the game. For example, a wager of one credit activates one of the symbols, a wager of two credits activates two of the symbols, a wager of three credits activates three of the symbols, a wager of four credits activates four of the symbols and a wager of five credits activates all of the symbols for the play of the game. It should be appreciated that any suitable wager amounts may be associated with the activated symbols and any suitable number of symbols may be activated based on the wager amounts. The wager levels or amounts and the number of symbols activated based on the wager amounts can be linear or non-linear. After the player makes or places a wager in the play of the game, the gaming device activates the designated symbols associated with that wager amount or level. The gaming device then causes the symbol generators to generate a plurality of symbols in the matrix. The gaming device evaluates the activated symbols displayed by the matrix to determine if any winning symbol combinations are indicated or displayed by the matrix. Thus, in the present invention, the player's wager level is used to determine the symbols which will be evaluated to determine any winning symbol combinations in each play of the game. In other words, instead of selecting or wagering on paylines associated with the symbol generators or reels, the player is wagering on, purchasing or activating specific symbols of the symbol generators or reels.

In one embodiment, the gaming device provides an outcome such as an award to the player for symbol combinations including four, five, six or seven of the same activated symbols arranged in adjacent positions in the matrix such as in a straight line such as a column or a row or along a diagonal in the matrix. For example, a symbol combination including four activated symbols such as A-A-A-A positioned adjacent to each other in a row is a winning symbol combination. However, symbol combinations including three of the same activated symbols in a row, column or along a diagonal such as A-A-A, or four activated symbols which are not all adjacent to each other or are separated by a non-activated or non-purchased symbol such as A-A-E-A-A (where the E symbol is not activated) are not winning symbol combinations. Additionally, symbol combinations including only non-activated or non-purchased symbols are not winning symbol combinations. It should be appreciated that the gaming device may provide an award for symbol combinations including symbols arranged along a straight line (i.e, a linear symbol combination) or in any suitable pattern or configuration such as a non-linear symbol combination.

In this embodiment, after the gaming device evaluates the symbol combinations, the gaming device provides any awards to the player for winning symbol combinations displayed by the matrix. Accordingly, the gaming device enables the player to enhance or improve their chances of obtaining a winning symbol combination in the game by enabling the player to place a wager in the game to activate one or more of the symbols in the game. This increases the player's excitement and enjoyment of the game because the player can now increase their wager to increase the probability or chance of obtaining winning symbol combinations in the game and to potentially obtain a relatively large award in the game.

In one embodiment, all of the symbols generated by the symbol generators including blank symbols are obtainable, purchasable or activatable in each play of the game. In another embodiment, one or a plurality of the symbols generated by the symbol generators are obtainable, purchasable or activatable in each play of the game but not all of the symbols. In this embodiment, symbols such as blank symbols, wild symbols or any other designated symbol or symbols may not be purchasable or activatable in the game. Moreover, in one embodiment, one or more of the symbols generated by the symbol generators is purchasable or activatable in each play of the game. It should be appreciated that one or more of the symbols generated by the symbol generators may be purchasable or activatable in one, a plurality or all of the plays of a game.

In another embodiment, a range of credits is associated with one or more of the symbols generated by the symbol generators. For example, in a gaming device including symbol generators having the symbols A, B and C, the gaming device enables a player to wager up to two credits (i.e., one or two credits) to purchase or activate the symbol A, between three and four credits to purchase or activate symbols A and B, and between five and six credits to purchase or activate symbols A, B and C or all of the symbols in the game.

In another embodiment, the symbols generated by the symbol generator include at least one wild symbol. The wild symbol substitutes for at least one of the other symbols on the symbol generators and enhances a player's chance of obtaining a winning symbol combination of the game. It should be appreciated that the wild symbol may substitute for or change to one of the symbols on the symbol generators in a matrix. It should also be appreciated that each symbol generator is adapted to generate one or more wild symbols or any suitable number of wild symbols in the game.

In a further embodiment, a progressive award is associated with the game of the present invention where the progressive award is provided to a player when the player wagers the maximum wager or maximum wager amount to activate the wild symbol, and the symbol generators generate the activated wild symbol along each of the diagonals in the matrix. The gaming device then provides the progressive award to the player in that play of the game. It should be appreciated that the progressive award may be activated and provided to the player based on any suitable wager amount or based on any suitable configuration or arrangement of one or more of the symbols in the matrix.

In another embodiment, the symbols include at least one scatter symbol. In this embodiment, the gaming device enables the player to play at least one secondary game, bonus game, sub-game or other game when a designated number of the scatter symbols are generated by or indicated by the symbol generators in the matrix. For example, the gaming device initiates one or more bonus games when a plurality of the scatter symbols is displayed by the matrix in any of the positions of the matrix in a play of the game (i.e., a scatter pay combination). In one embodiment, the gaming device provides a number of bonus games or a number of plays of a bonus game equal to the number of activated scatter symbols displayed by the matrix in the play of the game. For example, when four scatter symbols appear or are displayed by the matrix, the gaming devices provides four bonus games or four plays of a bonus game to the player. In another embodiment, a designated or random number of bonus games are associated with each winning symbol combination including the scatter symbols. It should be appreciated that the secondary or bonus games provided to the player may be any suitable bonus game or games. In one embodiment, the bonus game includes a plurality of masked selections which each include an outcome such as award. The gaming device randomly picks or selects one or more of the selections to provide an award or bonus pay to the player in the bonus game. The gaming device then enables the player to accept the generated award as the award for the next bonus game or games. If the player does not accept the generated bonus award, the gaming device randomly determines another bonus award to provide to the player in the next bonus game. The gaming device provides bonus awards to the player until there are no bonus games remaining. The gaming device then returns the player to the primary or initial game. Accordingly, the scatter symbol enables the player to obtain one or more additional awards and potentially a very large award in the game.

It is therefore an advantage of the present invention to provide a gaming device having a matching symbol game which enables a player place a wager to increase the likelihood of obtaining a winning symbol combination in the game.

Another advantage of the present invention is to provide a gaming device that enables a player to place a wager to activate one, a plurality or all of the symbols in a game.

Another advantage of the present invention is to provide a gaming device having a game that enables a player to purchase one, a plurality or all of a plurality of symbols in the game, wherein a plurality of the symbols are randomly generated, and wherein the purchased symbols of the randomly generated symbols are evaluated against winning symbol combinations to determine any awards to provide to the player.

Additional features and advantages of the present invention are described in, and will be apparent from, the following Detailed Description of the Invention and the Figures.

BRIEF DESCRIPTION OF THE FIGURES

FIG. 3A is a table illustrating the relationship between a player's wager amount and the activated symbols in a game.

FIG. 3B is an award table illustrating the winning symbol combinations and the award associated with each of the winning symbol combinations.

FIG. 3C is a table illustrating the relationship between different scatter symbol combinations and the awards associated with the scatter symbol combinations.

DETAILED DESCRIPTION OF THE INVENTION

Gaming Device and Electronics

Figure 1A:
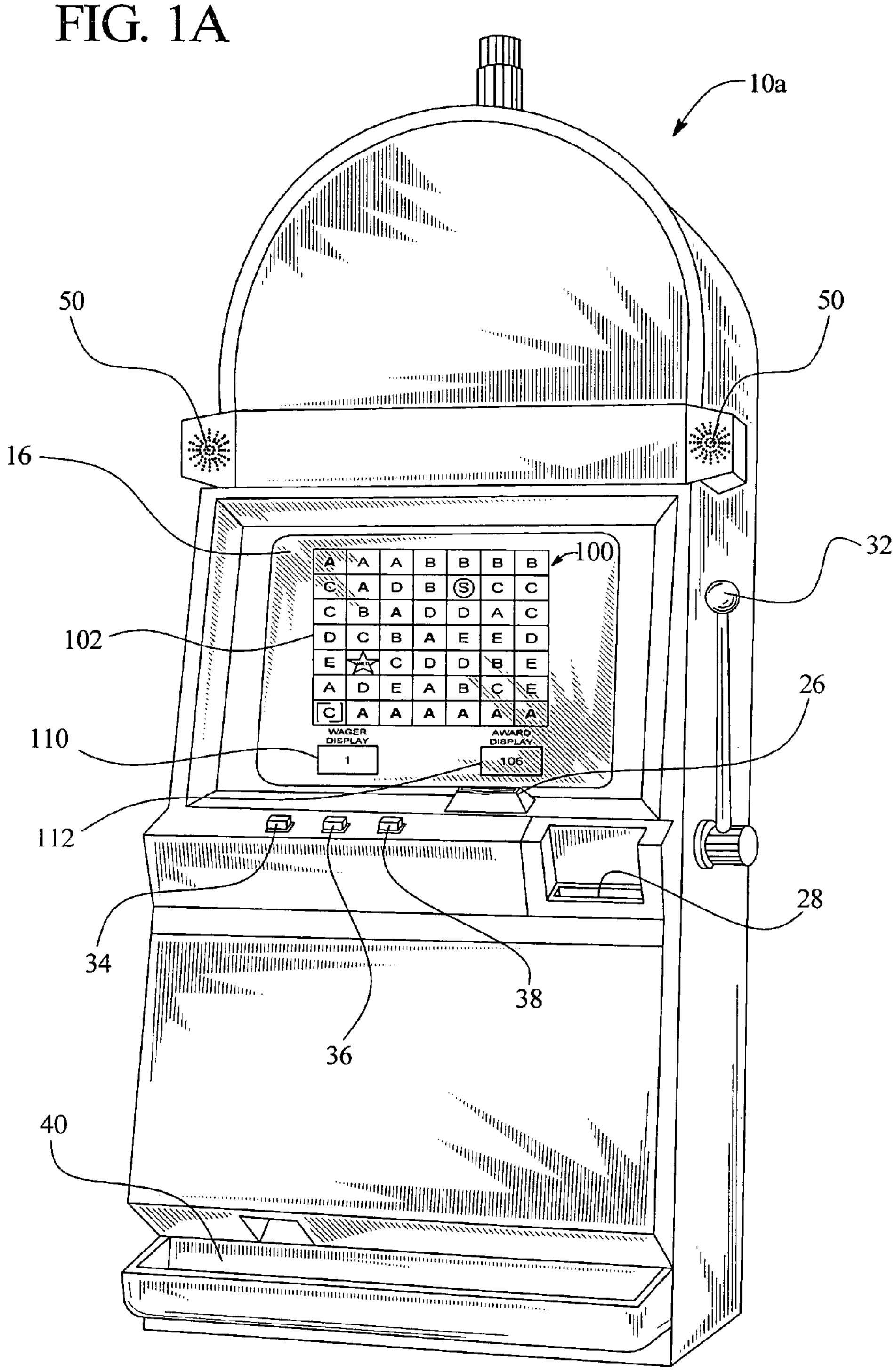
FIG. 1A is a perspective view of one embodiment of the gaming device of the present invention.
Figure 1B:
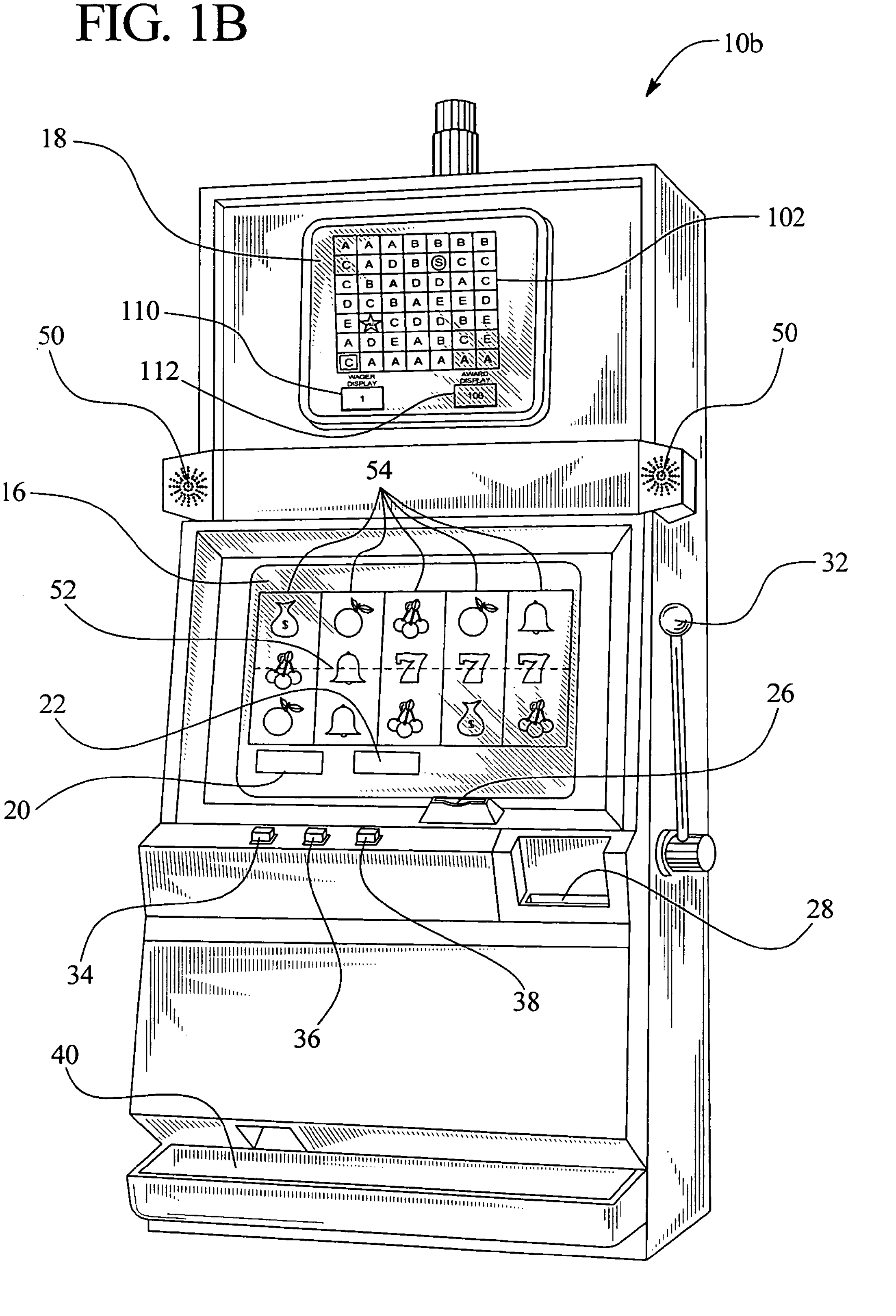
FIG. 1B is a perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
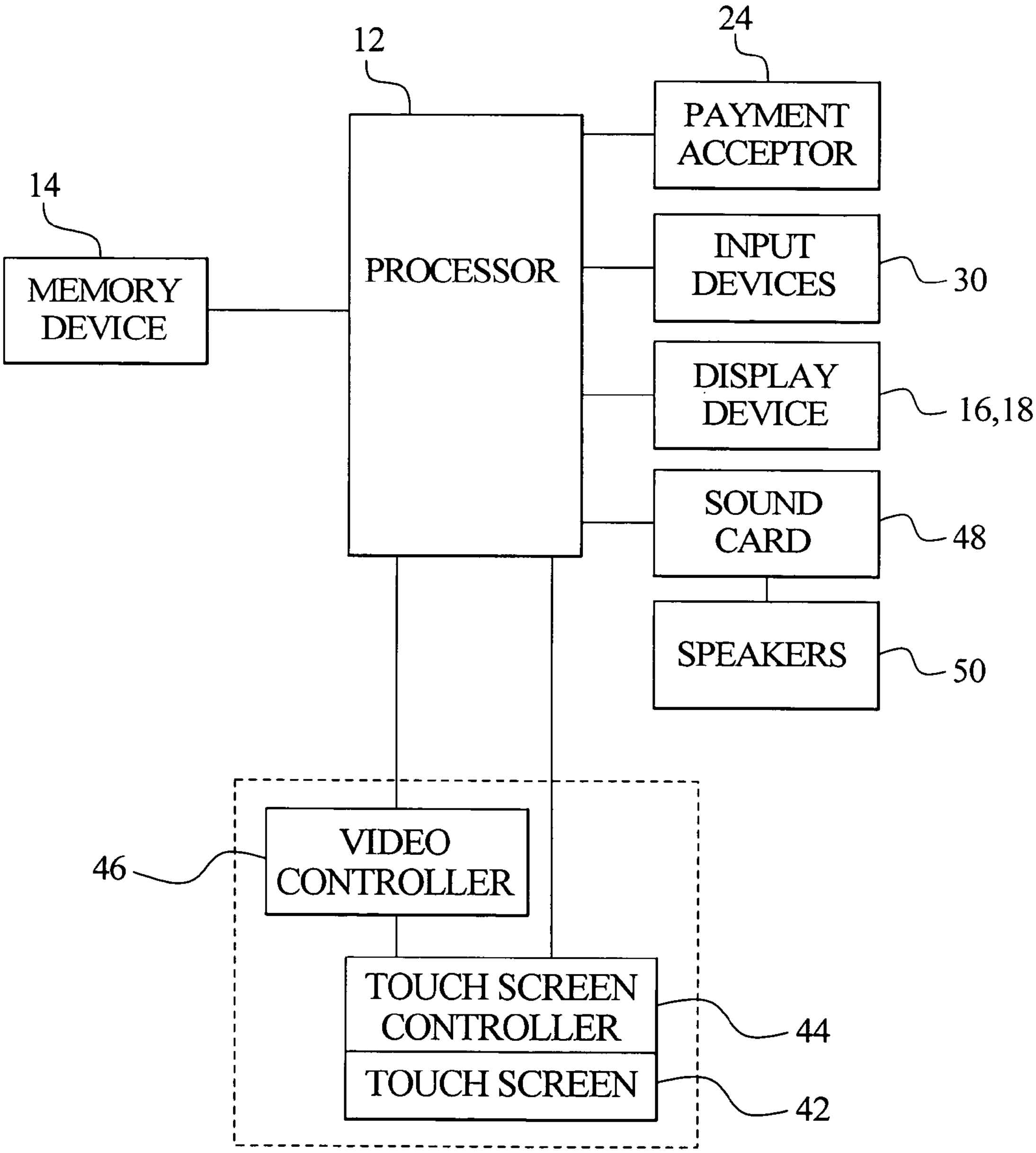
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, the gaming device includes a symbol display, grid or matrix 100 having a plurality of positions where each position includes an independently activated reel described in more detail below. In one embodiment, the reels are in a video format. In this embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18: The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects, such as mechanical, virtual or video reels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable reels, configured to display at least one game or other suitable image, symbol or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, or any other suitable primary or base game may be implemented into the present invention.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game as described in more detail below. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
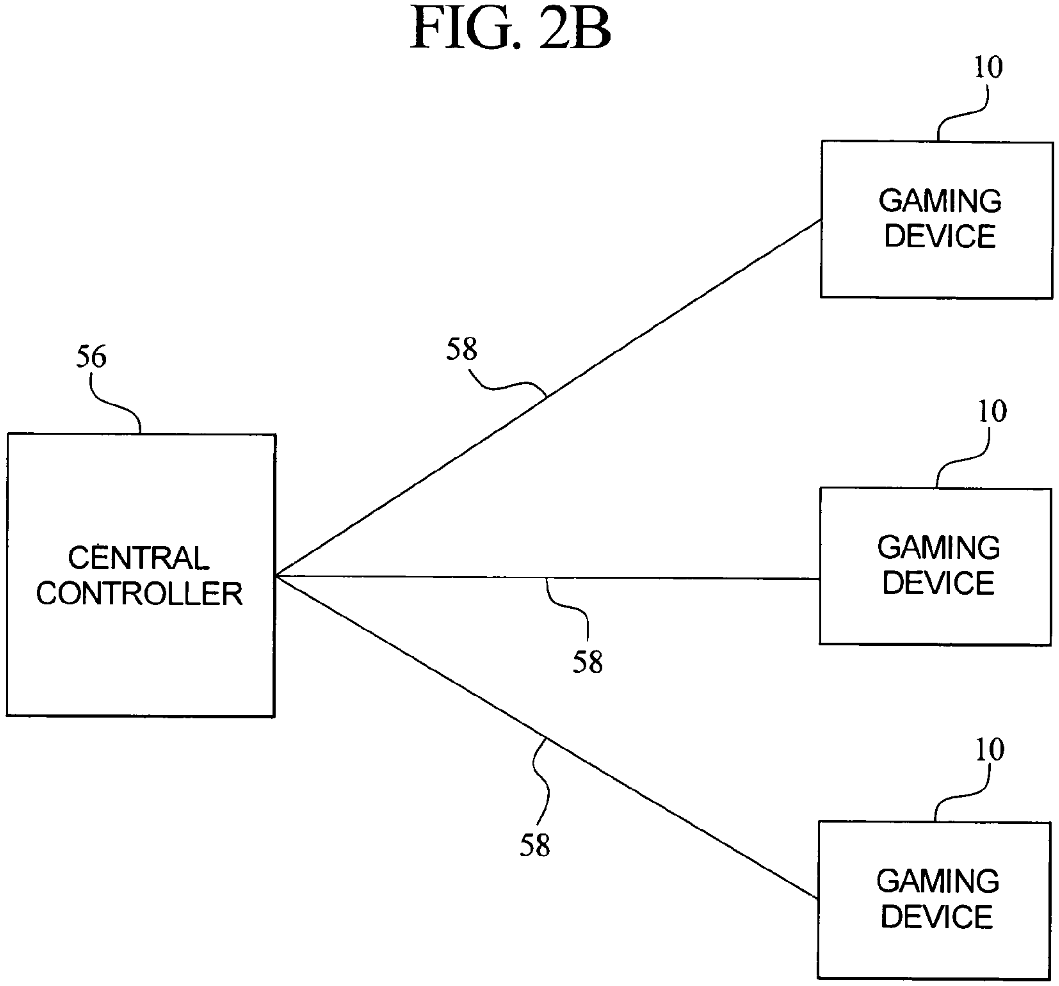
FIG. 2B is a schematic block diagram illustrating the plurality of gaming terminals and communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Matching Symbol Game

Figure 4A:
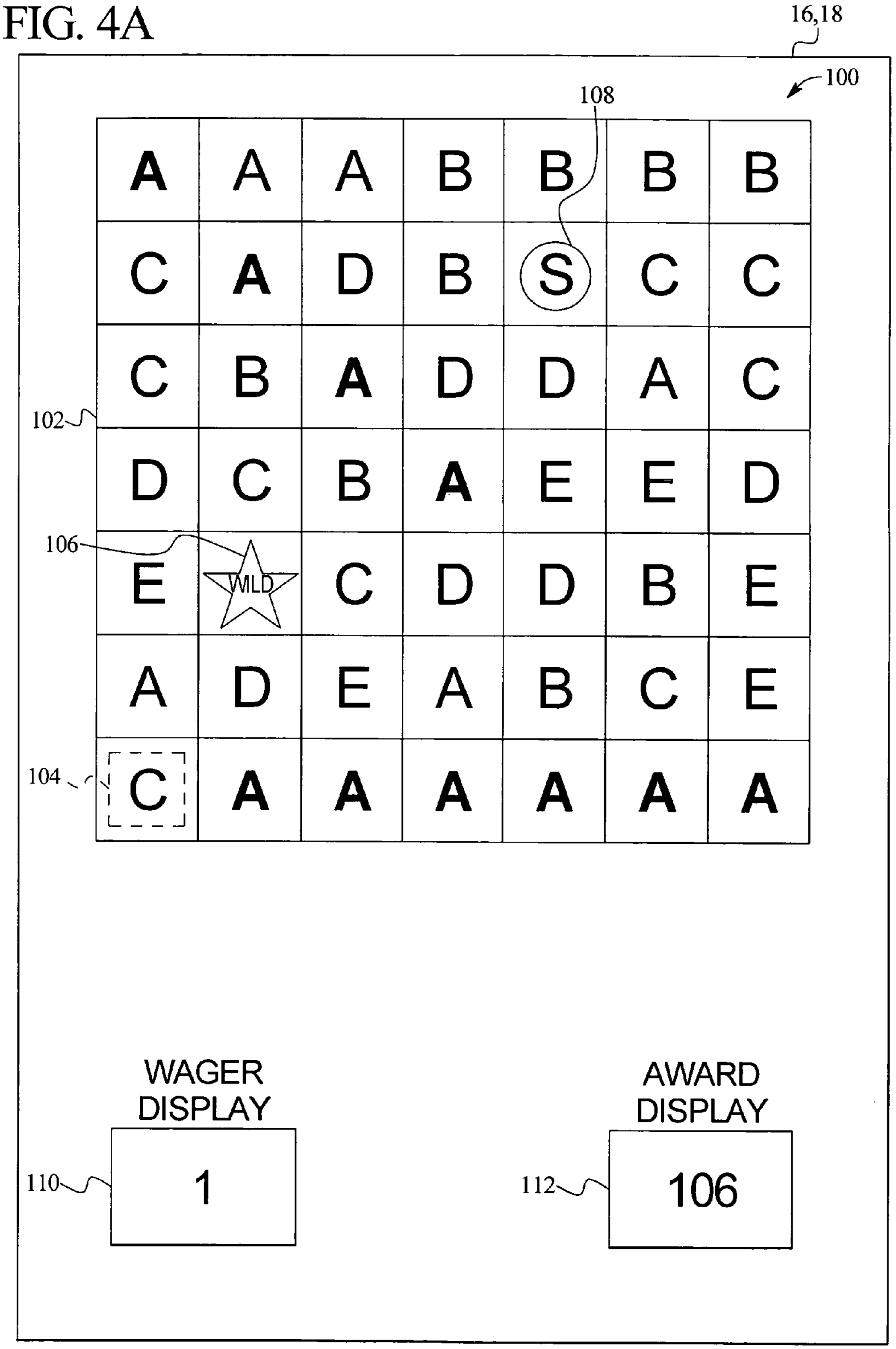
FIG. 4A is an enlarged elevation view of an example of one embodiment of the present invention where a player's wager activates one symbol in a play of a game.

Referring to FIGS. 1A, 1B and 4A, in one embodiment, the present invention is directed to a gaming device including a matching symbol primary game. More specifically, the gaming device includes a primary game operable upon a wager and which includes a symbol display, grid or matrix 100 which displays a plurality of symbols to a player. In each play of the game, the gaming device enables the player to place or make a wager from a plurality of different wager amounts to obtain, purchase or activate one or more sets of symbols (i.e., one, a plurality or all of the symbols) in that play of the game. The sets of symbols include one, a plurality or all of the symbols. For example, the first set of symbols includes A symbols. The second set of symbols includes both the A and B symbols. The third set of symbols includes the A, B and C symbols. It should be appreciated that each set can include the same or related symbols, at least one different symbol or a plurality of different symbols. For example, a set including the A symbol may include A symbols of all different sizes and/or shapes. In another example, a set includes identical A symbols. It should be appreciated that each set may include any suitable number of symbols having any suitable size, shape, image and/or configuration.

In one embodiment, the number of symbols activated in the play of the game increases as the wager amount or level increases. The symbols displayed by the matrix 100 are evaluated to determine if any symbol combinations including the purchased or activated sets of symbols or symbols are displayed by the matrix in the game. In one embodiment, as described in more detail below, a winning symbol combination includes a designated number of the same or identical symbols arranged in pattern such as a straight line such as in a row or a column or along a diagonal in the matrix 100 in the play of the game. It should be appreciated that a winning symbol combination may include symbols arranged along a line such as a straight line (i.e., a linear symbol combination) or in any suitable line, pattern or configuration such as a non-linear symbol combination. In this embodiment, the gaming device provides an outcome such as an award to the player for at least one and preferably each winning symbol combination displayed by the matrix 100 in the play of the game. Players therefore have more opportunities to obtain winning symbol combinations in a play of the game if more of the symbols are activated in the game. Accordingly, the matching game of the present invention increases a player's excitement and enjoyment of the game because the players can make a wager to increase the number of activated symbols in a game and thereby increase the player's chances of obtaining one or more winning symbol combinations and awards in the game.

In one embodiment, the matching game includes a symbol display, grid or matrix 100 which has a plurality of positions defining at least one row and at least one column. Each of the positions includes at least one symbol display or independently operable symbol generator 102. The symbol displays or symbol generators may be reels, wheels, dice or any other suitable symbol display. In this embodiment, the matrix 100 includes forty-nine positions defining seven rows and seven columns, where each of the positions includes one of the symbol generators 102 as illustrated in FIG. 4A. It should be appreciated that the matrix 100 may include any suitable number of the symbol generators. It should also be appreciated that the symbol generators 102 may be arranged in any suitable shape or configuration such as a three row by three column, a four row by twelve column or a seven row by four column matrix. In one embodiment, the symbol generators 102 include or are each independently operated reels. In one embodiment, the reels are the reels described in U.S. Pat. No. 6,413,162. It should be appreciated that the symbol generators may be reels, wheels or any other suitable symbol generator or symbol display. It should also be appreciated that the symbol display or matrix may be any suitable matrix such as a seven by seven matrix, four by twelve matrix, ten by five matrix or any suitable size or shape such as square matrix, rectangular matrix, circle-shaped matrix, diamond shaped matrix or any other suitable shape, image or configuration.

In one embodiment, the symbol generators or reels 102 each generate or display at least one symbol 104 from a plurality of different symbols in a play of the game. In this embodiment, the symbol generators 102 are each independently activated to generate at least one of the symbols 104. It should be appreciated that the symbol generators 102 may be simultaneously activated, sequentially activated, randomly activated or activated in any suitable order or pattern. In the illustrated embodiment, the symbols 104 include the letters A, B, C, D and E as illustrated in FIGS. 1A, 1B and 4A, and include at least one wild symbol 106 and at least one scatter symbol 108. It should be appreciated that the symbols may be any suitable letters, numbers, characters or images and may include any suitable number of the wild symbols 106 and scatter symbols 108 including none of the wild or scatter symbols.

In one embodiment, the gaming device includes a wager display 110 that indicates a wager made or placed by a player for a play of the game to purchase or activate one or more of the symbols 104 in the play of the game. The gaming device also includes an outcome or award display 112 which indicates the outcome or award provided to the player in that play of the game. It should be appreciated that the gaming device may include any suitable display or displays in a play of the game.

Referring now to FIG. 3A, an example of wager table is illustrated where the table includes a plurality of different wager amounts and a plurality of sets of symbols 104 which are purchasable or activatable based on the different wager amounts. For example, a wager of one credit by a player purchases or activates the symbol A (i.e, a set including the symbol A). A wager of two credits purchases or activates symbols A and B (i.e., a set including symbols A and B). A wager of three credits purchases or activates symbols A, B and C (i.e., a set including symbols A, B and C). A wager of four credits purchases or activates symbols A, B, C and D (i.e., a set including symbols A, B, C and D). A wager of five credits purchases or activates symbols A, B, C, D and E (i.e., a set including symbols A, B, C, D and E). Additionally, a wager of ten credits purchases or activates all of the symbols A, B, C, D and E and the scatter symbol (i.e., a set including symbols A, B, C, D and E and the scatter symbol). A wager of twenty credits purchases or activates symbols A, B, C, D and E, the scatter symbol, the wild symbol (i.e., a set including symbols A, B, C, D and E, the scatter symbol and the wild symbol) and a progressive jackpot which is described in more detail below. As shown by the table, the probability of obtaining a winning symbol combination in a play of the game increases as the number of credits wagered by the player increases because the number of purchased or activated symbols increases.

It should be appreciated that the wager levels or amounts and the number of symbols or sets of symbols activated based on the wager amounts may be linear or non-linear. As described above, the wager amounts and the activated symbols associated with the wager amounts can be linear such as wager amounts or levels of one credit, two credits and three credits which purchase or activate one symbol, two symbols or three symbols, respectively. The wager levels or wager amounts and the activated symbols associated with the wager amounts can also be non-linear. For example, the gaming device enables a player to wager one credit to activate two symbols, five credits to activate three symbols and twelve credits to activate five symbols. It should be appreciated that any suitable wager amounts can be associated with any suitable number of the activated symbols in each play of the game.

Referring now to FIG. 3B, another table is shown which illustrates the different winning symbol combinations in a game. Specifically, a winning symbol combination including four adjacent matching symbols arranged in a pattern such as a straight line such as in a row or a column, or on a diagonal in the matrix 100 provides an award of six credits. A winning symbol combination including five adjacent matching symbols provides an award of fifteen credits. A winning symbol combination including six adjacent matching symbols provides an award of one hundred credits. A winning symbol combination including seven adjacent matching symbols arranged in a row, column or diagonal provides an award of one thousand credits.

In one embodiment, all of the symbols generated by the symbol generators including blank symbols are obtainable, purchasable or activatable in each play of the game. In another embodiment, one or a plurality of the symbols generated by the symbol generators are obtainable, purchasable or activatable in each play of the game but not all of the symbols. For example, the gaming device enables a player to purchase or activate symbols A, B and C but not D. Therefore, in this embodiment, symbols such as blank symbols, wild symbols or any other designated symbol or symbols may not be obtainable, purchasable or activatable in the game. It should be appreciated that the purchasable or activatable symbols in each play of the game may be randomly determined, pre-determined or determined in any suitable manner. Moreover, in one embodiment, one or more of the symbols generated by the symbol generators is purchasable or activatable in each play of the game. It should be appreciated that one or more of the symbols generated by the symbol generators may be purchasable or activatable in one, a plurality or all of the plays of a game.

In another embodiment, a range of credits is associated with one or more of the symbols generated by the symbol generators. For example, in a gaming device including symbol generators having activatable or purchasable symbols A, B, C, D and E as shown in FIG. 4A, the gaming device enables a player to wager up to two credits (i.e., one or two credits) to purchase or activate the symbol A, between three and four credits to purchase or activate symbols A and B, between five and six credits to purchase or activate symbols A, B and C, seven to nine credits to purchase or activate symbols A, B, C and D and ten to fifteen credits to purchase or activate symbols A, B, C, D and E or all of the symbols in that play of the game.

It should be appreciated that any suitable number of matching activated symbols or arrangement of matching activated symbols may be employed in each play of the game. It should also be appreciated that any suitable outcome or award may be associated with the different designated or winning symbol combination.

Referring now to FIG. 3C, a table illustrates the outcome or award associated with different combinations of the scatter symbol in the matrix. For example, a symbol combination including four scatter symbols anywhere in the matrix (regardless of whether the scatter symbols are in a row, a column or a diagonal) provides an outcome or award of five bonus games. The bonus game or games are described in more detail in the following paragraphs. A symbol combination including five scatter symbols anywhere in the matrix provides an award of seven bonus games. A symbol combination including six scatter symbols provides an award of twelve bonus games. It should be appreciated that any suitable combination of the scatter symbols may be employed in a game. It should also be appreciated that any suitable outcome or award may be associated with each of the scatter symbol combinations.

Referring now to FIG. 4A, an example of the above embodiment of the matching game is illustrated where a player wagers one credit in a play of the game. As illustrated in FIG. 3A, a wager of one credit purchases or activates one symbol, the symbol A (i.e., a set including the symbol A), in the play of the game. The gaming device will therefore provide an outcome or award to the player if any winning symbol combinations including four or more matching adjacent A symbols are indicated or displayed by the matrix 100 such as in a row, column or along a diagonal in the play of the game. If any other winning symbol combinations are displayed or indicated by the matrix, the gaming device does not provide any outcomes or awards to the player. For example, a symbol combination including four or more B symbols in adjacent positions in the matrix does not provide an award to the player. Similarly, four or more A symbols in the same row in the matrix but which are separated by a non-purchased or non-activated symbol (i.e., A-A-B-A-A) in the play of the game does not provide an winning symbol combination in that play of the game. In the illustrated example, the gaming device or player activates the symbol generators such as the independently operated reels 102 in the play of the game to display the symbols in the matrix. After the reels are activated, a plurality of the symbols are displayed to the player. The gaming device evaluates the symbols displayed by the matrix 100 to determine if any of the winning symbol combinations including the symbol A shown in the table in FIG. 3B are indicated in this play of the game. The matrix 100 displays winning symbol combinations including four A symbols arranged on a diagonal (i.e., A symbols in the positions at column one, row one; column two, row two; column three, row three and column four, row four, respectively) and six A symbols arranged in a straight line in row seven or the bottom row of the matrix 100 as shown in bold in FIG. 4A. Based on the award table shown in FIG. 3B, a winning symbol combination including four A symbols provides an outcome or award of six credits and a winning symbol combination including six A symbols provides an award of one hundred credits to the player. In this example, the gaming device sums the awards to provide the player with an award of one hundred six as indicated by the award display 112.

As illustrated in FIG. 4A, a symbol combination including four B symbols is displayed or indicated in row one at columns four, five, six and seven. Because the player did not place a wager amount to activate the B symbol in this play of the game, the B symbol was not activated in the game and therefore not evaluated in the play of the game. If the player would have placed a wager of two credits to purchase or activate both symbols A and B, the gaming device would have provided an additional or extra award for this symbol combination in this play of the game.

In one embodiment, when a plurality of winning symbol combinations are indicated or displayed by the matrix 100, the gaming device provides the largest award associated with the winning symbol combinations to the player. In another embodiment, the gaming device provides each award associated with the winning symbol combinations to the player. In this embodiment the gaming device sums or adds the awards together and provides the player with a total award for the play of the game. It should be appreciated that the gaming device may sum, multiply or otherwise modify the awards associated with each winning symbol combination in a play of the game. It should also be appreciated that the gaming device may provide any suitable number of the outcomes or awards to the player in a play of the game.

Figure 4B:
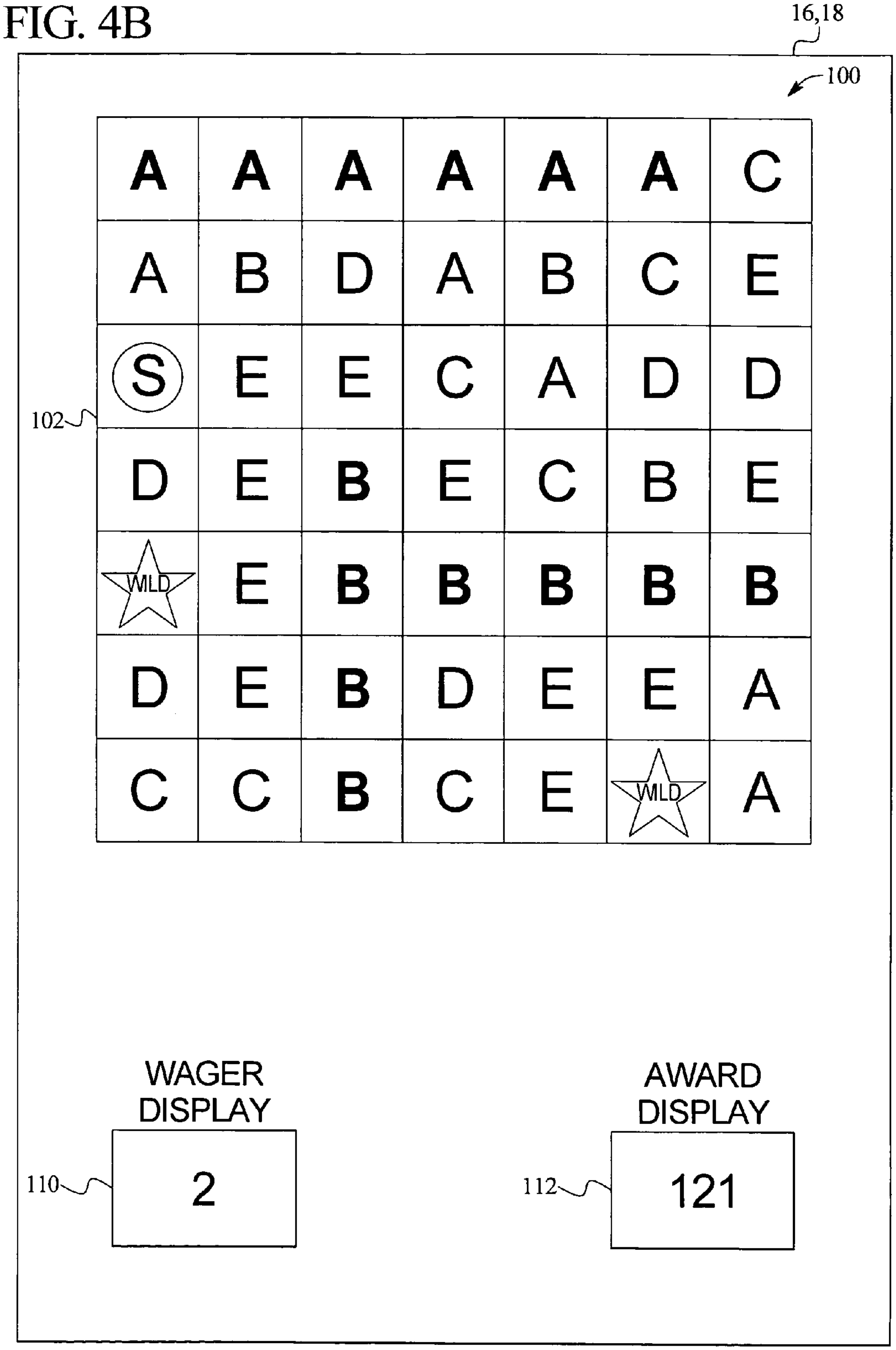
FIG. 4B is an enlarged elevation view of another example of the embodiment of FIG. 4A where a player's wager activates two symbols in a play of a game.

Referring now to FIG. 4B, another example of the above embodiment is illustrated where the player wagers two credits in a play of the game. As shown in FIG. 3A, a wager of two credits purchases or activates both symbols A and B (i.e, the set including symbols A and B) in the play of the game. The gaming device therefore will provide an award for each winning symbol combination (as defined by the table in FIG. 3B) including the symbol A and/or the symbol B in this play of the game. The gaming device or player activates the independent reels 102 to display a plurality of symbols in the matrix. Specifically, after the reels are activated, three winning symbol combinations are indicated or displayed by the matrix 100 in this play of the game as shown in bold in the matrix. A winning symbol combination including six A symbols is arranged in row one at columns one, two, three, four, five and six of the matrix. Another winning symbol combination including four B symbols is arranged in a column three at rows four, five, six and seven in the matrix. Additionally, a winning symbol combination including five B symbols is arranged in row five at columns three, four, five, six and seven in the matrix. The gaming device therefore provides awards of one hundred for the winning symbol combination including the six A symbols, six for the winning symbol combination including the four B symbols and fifteen for the winning symbol combination including the five B symbols. The gaming device sums or adds the awards together to provide a total award of one hundred twenty-one to the player in this play of the game as indicated by the award display 112. As shown in the examples illustrated in FIGS. 4A and 4B, the player obtained more winning symbol combinations when the player wagered more credits and thereby purchased or activated more of the symbols in the play of the game.

As illustrated in FIG. 4B, a symbol combination including four E symbols is displayed or indicated in column two at rows three, four, five and six. Because the player did not place a wager amount to activate the E symbol in this play of the game, the E symbol was not activated in the game and therefore not evaluated as part of any winning symbol combination in the play of the game. If the player would have placed a wager of five credits to purchase or activate both all of the symbols and specifically purchase or activate the E symbol in this play of the game, the gaming device would have provided an additional or extra award for this symbol combination in this play of the game.

Figure 4C:
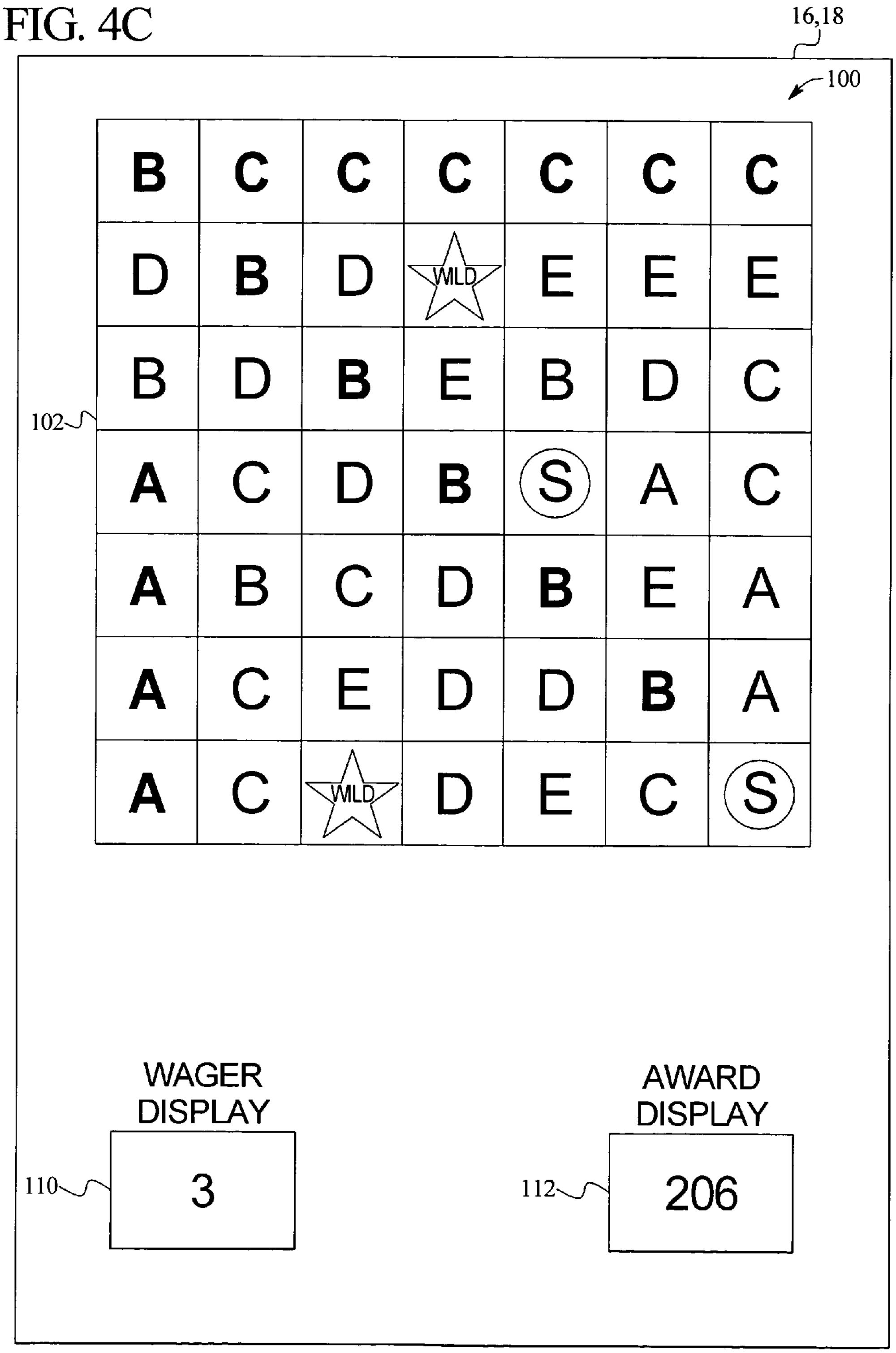
FIG. 4C is an enlarged elevation view of a further example of the embodiment of FIG. 4A where a player's wager activates three symbols in a play of a game.

Referring now to FIG. 4C, another example of the embodiment described above is illustrated where the player wagers three credits to purchase or activate three symbols in the game as indicated by wager display 110. Specifically, the gaming device purchases or activates symbols A, B and C (i.e, the set including symbols A, B and C) in the game as illustrated by the table in FIG. 3A. By activating more symbols in the game, the player has a better opportunity or higher probability of obtaining one or more winning symbol combinations in the game. This increases the player's excitement and enjoyment of the game. In this example, the gaming device or player activates the symbol generators such as reels 102 to display a plurality of the symbols in the matrix 100. After the reels are activated, the matrix indicates or displays three winning symbol combinations as shown in bold. The matrix 100 indicates or displays a winning symbol combination including a row of six C symbols in row one at columns two, three, four, five, six and seven; a column of four A symbols in column one at rows four, five, six and seven; and six B symbols arranged on along the diagonal at column one, row one; column two, row two; column three, row three; column four, row four; column five, row five and column six, row six. The winning symbol combinations including the six C symbols, four A symbols and six B symbols provide awards of one hundred, six and one hundred, respectively. The gaming device therefore provides a total award of two hundred six as indicated by the award display 112. Again, in this play of the game, the player obtained several winning symbol combinations and a larger award because the player activated more of the symbols in this play of the game.

Additionally, as illustrated in FIG. 4C, a symbol combination including five D symbols is displayed or indicated in along the diagonal at column one, row two; column two, row three; column three, row four; column four, row five; and column five, row six. Because the player did not place a wager amount to purchase or activate the D symbol in this play of the game, the D symbol was not activated in the game and therefore not evaluated in the play of the game. If the player would have placed a wager of four credits to purchase or activate the D symbol, the gaming device would have provided an additional or extra award for this symbol combination in this play of the game.

Figure 4D:
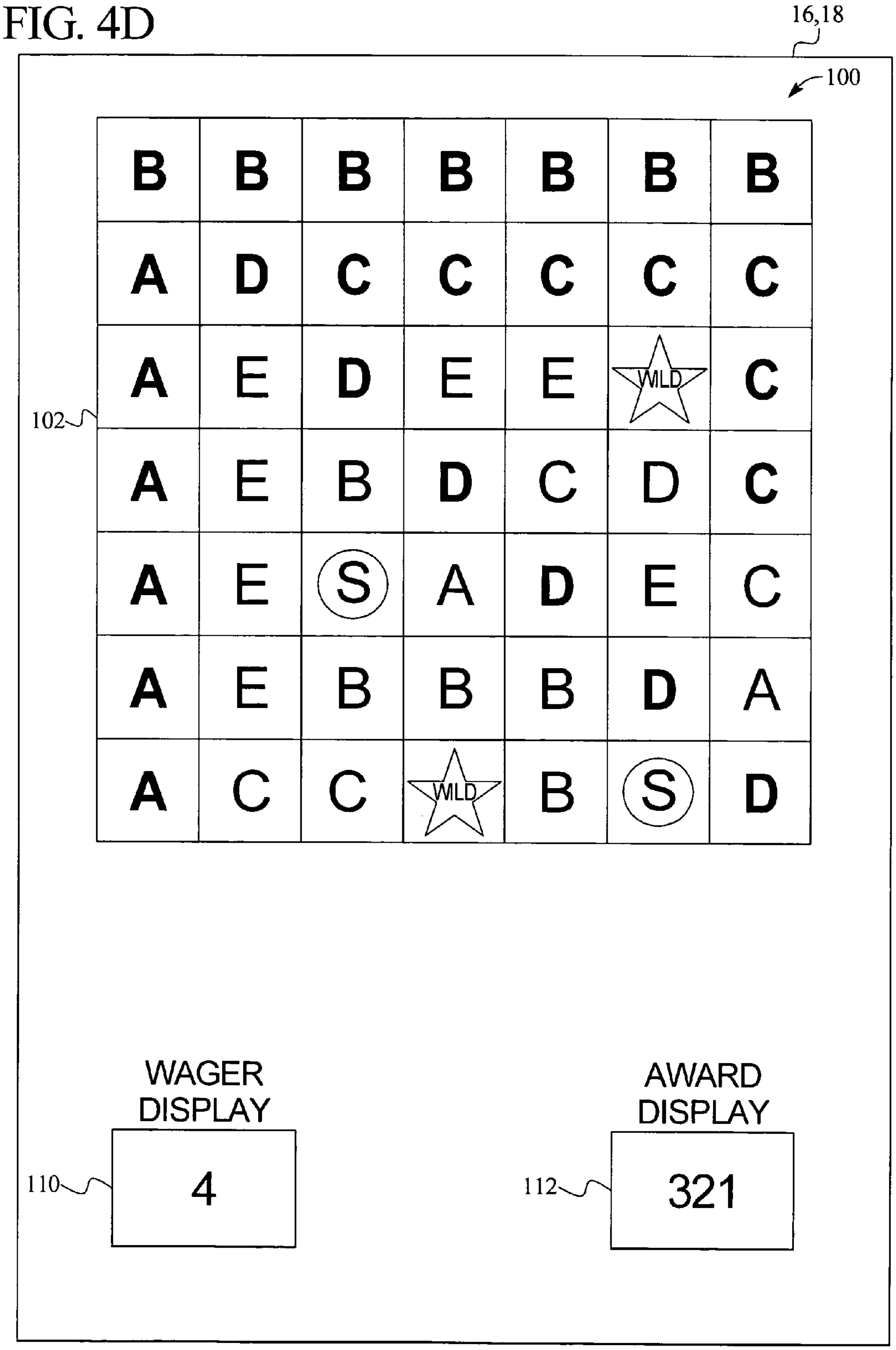
FIG. 4D is an enlarged elevation view of another example of the embodiment of FIG. 4A where a player's wager activates four symbols in a play of a game.

Referring now to FIG. 4D, a further example of the above embodiment is illustrated where the player wagers four credits in a play of the game as indicated by the wager display 110. A wager of four credits purchases or activates four symbols A, B, C and D (i.e., the set including symbols A, B, C and D) in this play of the game as indicated by the table in FIG. 3A. The gaming device or player activates the symbol generators or reels 102 to display a plurality of symbols in the matrix 100 in the play of the game. Five winning symbol combinations are indicated or displayed by the matrix 100 in this play of the game. Specifically, five winning symbol combinations are displayed by the matrix. The winning symbol combinations include six A symbols in column one at rows two, three, four, five, six and seven; six B symbols in row one at columns one, two, three, four, five and six; five C symbols in row two at columns three, four, five, six and seven; four C symbols in column seven at rows two, three, four and five; and six D symbols arranged along a diagonal at column three, row three; column four, row four; column five, row five; column six, row six and column seven, row seven. The gaming device therefore provides awards of one hundred for the winning symbol combination including six A symbols, one hundred for the winning symbol combination including six B symbols, six for the winning symbol combination including four C symbols, fifteen for the winning symbol combination including five C symbols and one hundred for the winning symbol combination including six D symbols as indicated by the table in FIG. 3B. The gaming device sums these awards and provides a total award of three hundred twenty-one to the player as indicated by the award display 112. In this example, the player obtained more winning symbol combinations by wagering additional credits to purchase or activate more of the symbols in the game. This increases the player's excitement and enjoyment of the game.

As illustrated in FIG. 4D, the player missed additional awards by not wagering more credits to purchase or activate more of the symbol in this play of the game. Specifically, a symbol combination including four E symbols is displayed or indicated in column two at rows three, four, five and six. Because the player did not place a wager amount to activate the E symbol in this play of the game, the E symbol was not activated in the game and therefore not evaluated in the play of the game. If the player would have placed a wager of five credits in this play of the game to purchase or activate the E symbol, the gaming device would have provided an additional or extra award for this symbol combination in this play of the game.

Figure 4E:
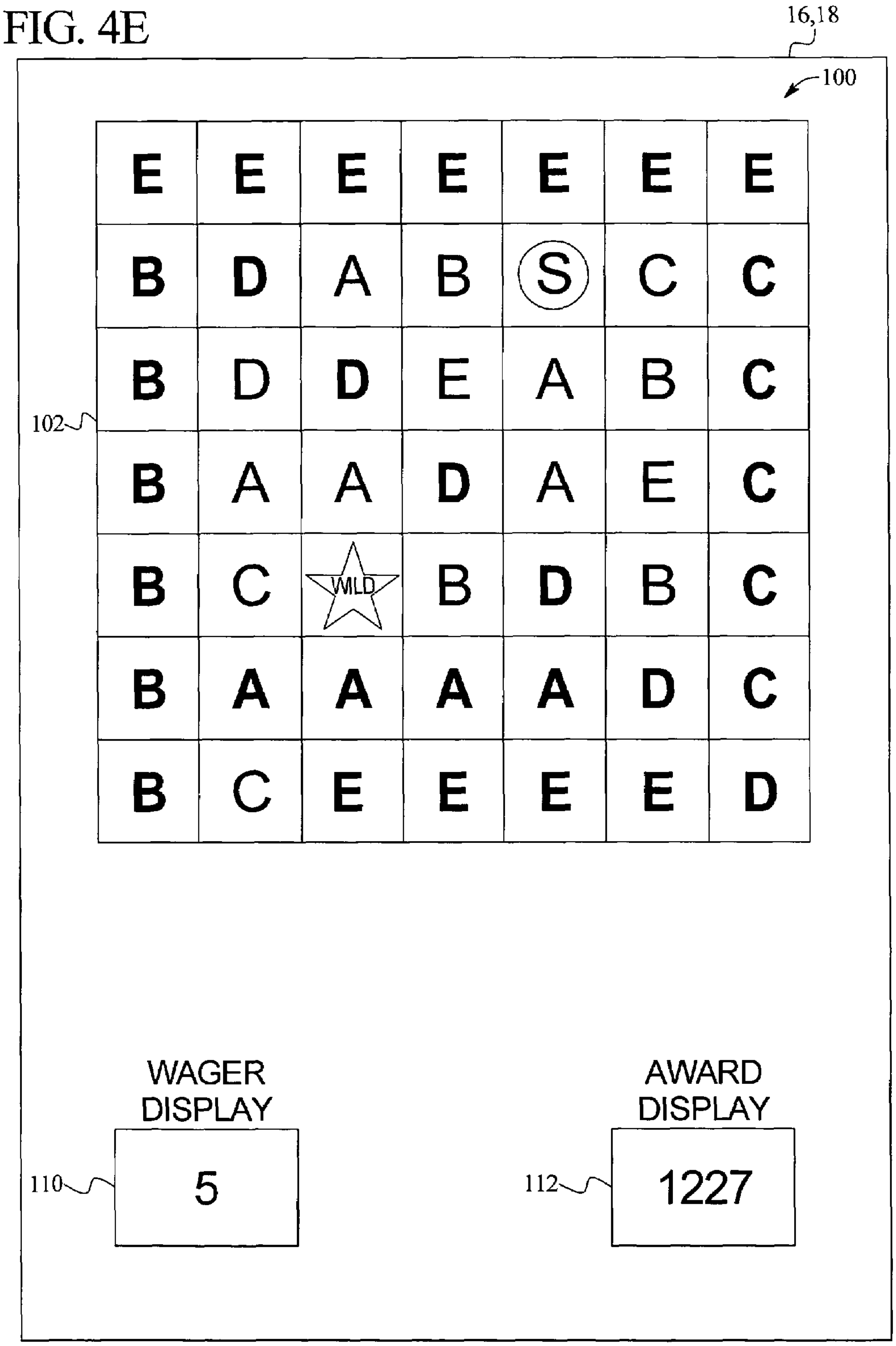
FIG. 4E is an enlarged elevation view of another example of the embodiment of FIG. 4A where a player's wager activates five symbols in a play of a game.

Referring now to FIG. 4E, another example of the above embodiment is illustrated where the player wagers five credits as indicated by the wager display 110. A wager of five credits purchases or activates five symbols A, B, C, D and E (i.e., the set including symbols A, B, C, D and E) in the play of the game as illustrated by the table in FIG. 3A. By wagering more credits in this play of the game, the player purchases or activates more of the symbols in the game and thereby increases their chances to obtain at least one winning symbol combination in the game.

In this example, the gaming device or player activates the reels 102 to display a plurality of the symbols in the matrix 100 to the player. In this example, the matrix 100 displays or indicates six winning symbol combinations in the play of the game. Specifically, the matrix indicates or displays winning symbol combinations including four A symbols in row six at columns two, three, four and five; six B symbols in column one at rows two, three, four, five, six and seven; five C symbols in column seven at rows two, three, four, five and six; six D symbols arranged along the diagonal at column two, row two; column three, row three; column four, row four; column five, row five; column six, row six and column seven, row seven; seven E symbols in row one at columns one, two, three, four, five, six and seven; and four E symbols in row seven at columns three, four, five and six. These winning symbol combinations provide awards of six, one hundred, fifteen, one hundred, one thousand and six, respectively, as shown in the table in FIG. 3B. Therefore, the gaming device sums the awards to provide a total award of one thousand two hundred twenty-seven to the player as indicated by the award display 112. In this example, the player obtained six winning symbol combinations by wagering additional credits to purchase or activate five of the symbols in the game. The player therefore obtained more awards by activating more of the symbols in the play of the game.

Figure 5A:
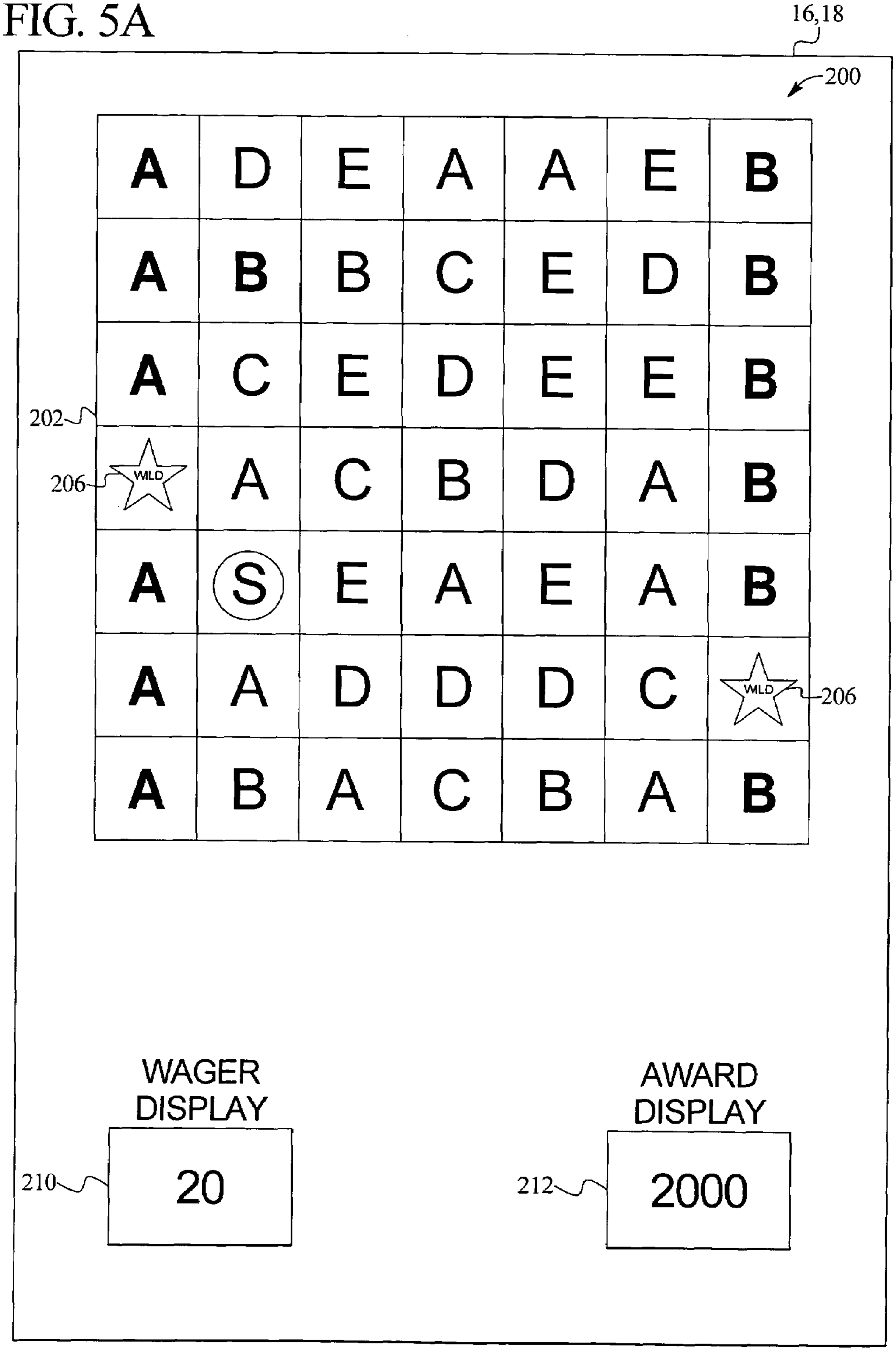
FIG. 5A is an enlarged elevation view of an example of another embodiment of the present invention where a player's wager activates five symbols and a wild symbol in a play of a game.
Figure 5B:
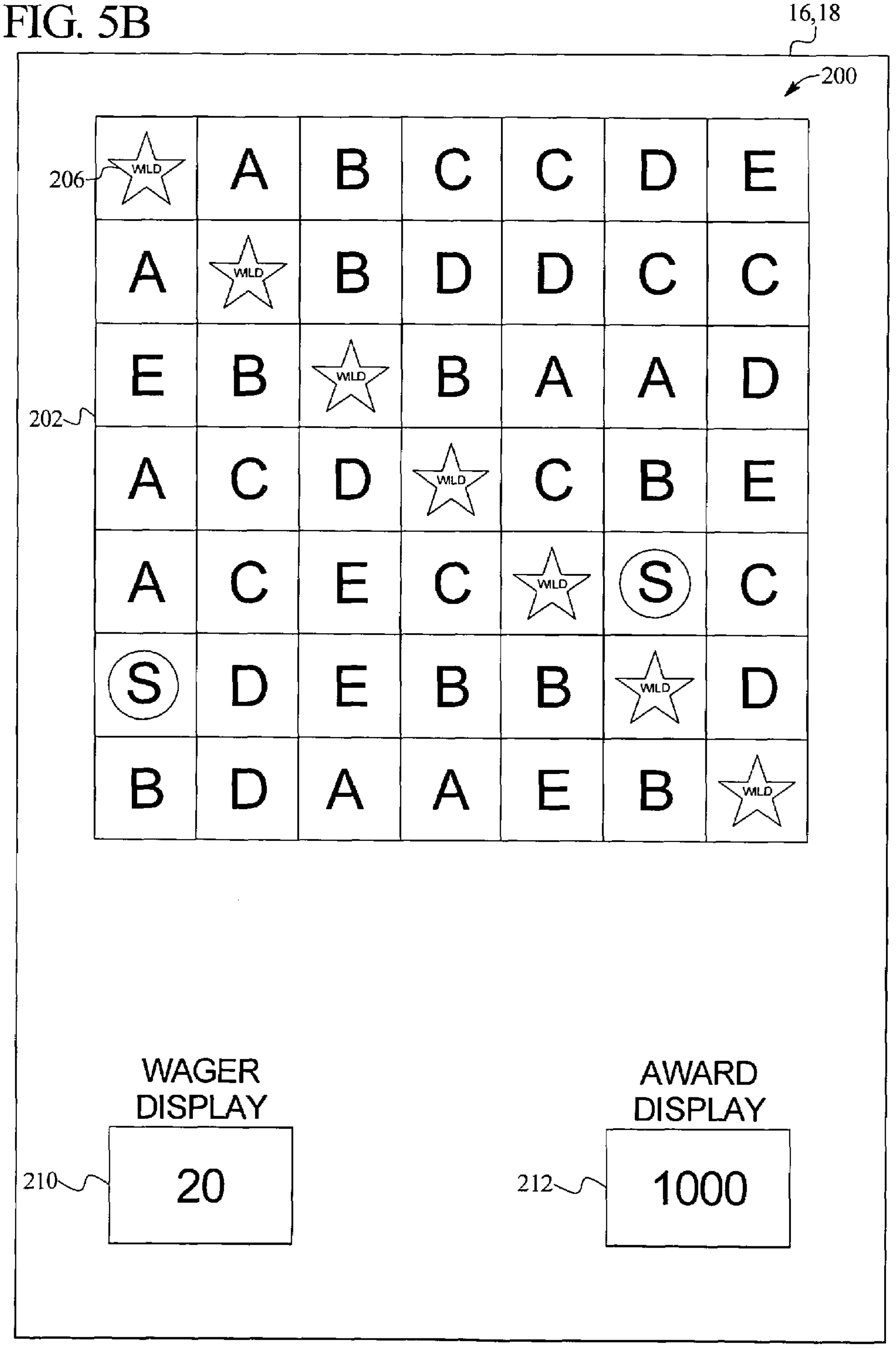
FIG. 5B is an enlarged elevation view of another example of the embodiment of FIG. 5B where a winning symbol combination includes a plurality of the wild symbols.

Referring now to FIGS. 5A and 5B, another embodiment of the present invention is illustrated where the symbols (or one or more of the symbol sets) include at least one purchasable or activatable wild symbol 206 in a play of the game. It should be appreciated that the symbol generators or reels 202 may each include one or more of the wild symbols 206. In this embodiment, the wild symbol 206 substitutes for or changes to any one of the other symbols generated or displayed by the symbol generators or reels 202 in the game. The wild symbol 206 therefore increases a player's chances of obtaining a winning symbol combination in a game. In this example, the wild symbol 206 is in the shape of a star. It should be appreciated that the wild symbol may be any suitable shape. Similar to the symbols described above, the wild symbol is activated based on the wager made by the player in the play of the game. As illustrated by FIG. 3B, in one embodiment, the wild symbol is activated when the player wagers twenty credits in the play of the game. It should be appreciated that the wild symbol 206 may be activated based upon any suitable wager amount.

In one example illustrated in FIG. 5A, a player wagers twenty credits in a play of the game. The wager of twenty credits purchases or activates symbols A, B, C, D, E, the scatter symbol (which is described in detail below), the wild symbol and the opportunity to obtain a progressive jackpot in the play of the game. The player can therefore obtain winning symbol combinations including any of the symbols A, B, C, D, E and the wild symbol in the game. In another embodiment, the gaming device activates the wild symbol in a play of the game when the player places a designated wager amount or when the player wagers at or more than a designated wager amount or level. It should be appreciated that the gaming device may activate the wild symbol in one or more plays of the game based on any suitable wager amount or level.

In the illustrated example, the gaming device or player activates the reels 202 to display a plurality of the symbols in the matrix 200 in a play of the game. After the reels 202 are activated, the matrix 200 displays or indicates two winning symbol combinations as shown in bold in FIG. 5A. The first winning symbol combination includes seven A symbols (i.e., six A symbols and one wild symbol which substitutes for an A symbol) in column one. The second winning symbol combination includes seven B symbols (i.e., six B symbols and one wild symbol) in column seven. The gaming device provides awards of one thousand for each of the winning symbol combinations. A total award of two thousand is provided to the player in this play of the game as indicated by the award display 212. As described above, the wild symbol enhances the player's award by changing non-winning symbol combinations (i.e., A-A-A) or symbol combinations that provide lesser awards (i.e., B-B-B-B-B) to symbol combinations that provide a larger award (i.e., B-B-B-B-B-B-B). The wild symbol therefore increases the excitement and enjoyment of the game for players by enabling players to obtain several awards and potentially a relatively large award in the game.

Referring now to FIG. 5B, another example of the above embodiment including the purchasable or activatable wild symbol is illustrated where the player again wagers twenty credits to purchase or activate symbols A, B, C, D and E and the wild symbol in the game. In this example, the gaming device or player activates the reels 202 to display a plurality of the symbols to the player in the matrix 200. The matrix 200 indicates a winning symbol combination including seven wild symbols arranged along a diagonal as shown in bold in FIG. 5B. A winning symbol combination including seven wild symbols provides an award of one thousand as illustrated in FIG. 3B. The award of one thousand is provided to the player as indicated by the award display 212. This example illustrates how the wild symbol 202 further enhances a player's chances of obtaining an award in a play of the game by forming a winning symbol combination in the game.

Figure 6A:
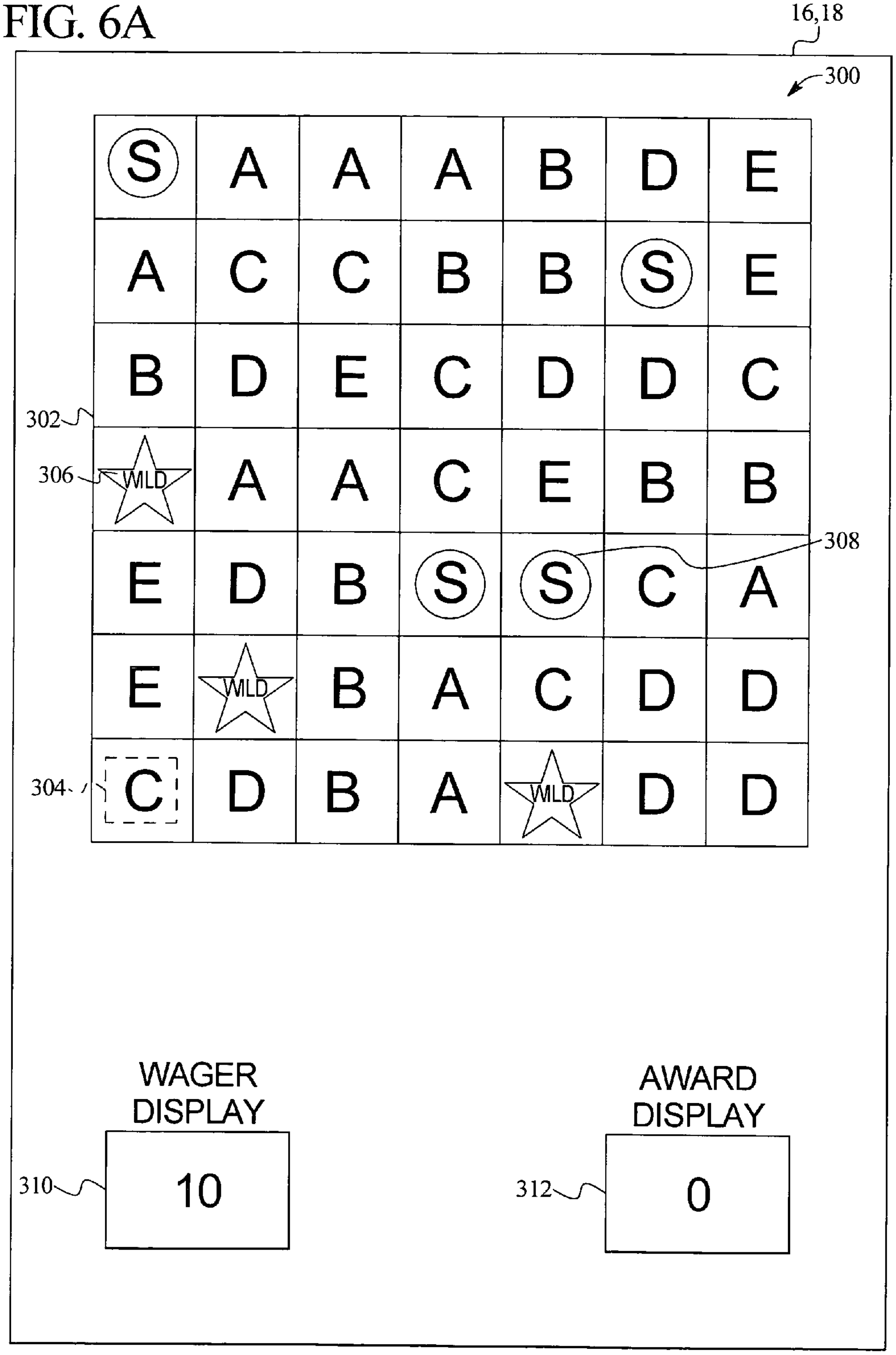
FIG. 6A is an enlarged elevation view of an example of a further embodiment of the present invention where a player's wager activates five symbols and a scatter symbol in a play of the game.

Referring now to FIG. 6A, another embodiment of the present invention is illustrated where the gaming device includes a matrix 300 having a plurality of positions where each position includes at least one independently operated symbol generator or reel 302. Each symbol generator or reel displays a plurality of symbols 304 to a player. In this embodiment, the symbols 304 include purchasable or activatable symbols A, B, C, D, E, at least one wild symbol 306 and at least one scatter symbol 308. In this embodiment, the gaming device enables the player to purchase or activate one or more of the symbols (or a set including these symbols) in a play of the game based on a wager made by the player. Specifically, the player may purchase or activate one or more of the symbols described above and the scatter symbol 308. The symbols 308 triggers or initiates one or more secondary games, bonus games or any other suitable games when a designated number of the scatter symbols are displayed by the matrix 300 in this play of the game. As illustrated in FIG. 3C, in one embodiment, four scatter symbols displayed anywhere in the matrix 300 provides five bonus games or five plays of a bonus game to the player. Similarly, five scatter symbols displayed anywhere in the matrix 300 provides seven bonus games or seven plays of a bonus game to the player and six scatter symbols displayed anywhere in the matrix provides twelve bonus games or twelve plays of a bonus game to the player. It should be appreciated that any suitable number of scatter symbols may provide one or more bonus games in a play of the game. It should also be appreciated that the secondary or bonus game may be any suitable game or games.

Referring to FIG. 6A, the player wagers ten credits in a play of the game which purchases or activates symbols A, B, C, D, E and the scatter symbol as illustrated by the table in FIG. 3A. The gaming device or player activates the reels 302. The matrix 300 displays a plurality of symbols to the player. Specifically, no winning symbol combinations including purchased or activated symbols A, B, C, D or E are indicated in this play of the game. A winning symbol combination including four scatter symbols 308 (shown in bold) is indicated by the matrix 300. The gaming device therefore provides five bonus game or five plays of a bonus game to the player.

Referring now to FIGS. 6B to 6G, an example of a secondary or bonus game initiated by the gaming device is illustrated where the bonus game includes a symbol display or matrix 400 including a plurality of masked selections 402. A plurality of outcomes or awards 404 are associated with the selections, and more specifically, at least one of the awards 404 is associated with each of the selections 402. It should be appreciated that at least one of the awards, a plurality of the awards or all of the awards may be different. In this bonus game, the gaming device randomly picks and displays one or more of the awards to the player. In one embodiment, an average award is associated with each bonus game and the gaming device provides or displays awards based on the average award amount. It should be appreciated that any suitable outcome or award may be associated with the selections 402. It should also be appreciated that the gaming device may randomly determine the award, pre-determine the award or enable the player to pick the award in each play of the bonus game.

In this embodiment, the gaming device enables the player to accept a randomly generated award in a bonus game and obtain that award in one or more of the subsequent bonus games. Thus, if the player obtains a relatively large award in a bonus game, the player can choose to obtain that same award in one or more subsequent bonus games. If the player does not accept the award (i.e, does not choose to obtain that same award in one or more subsequent bonus games), the gaming device randomly determines or generates another bonus award in the next bonus game. The gaming device then enables the player to accept or reject the indicated award in one or more subsequent bonus games. It should be appreciated that the player may accept to obtain the bonus award or bonus payout in one, a plurality or all of the bonus games provided to the player. It should also be appreciated that the gaming device may enable the player to accept any of the bonus awards in one, a plurality or all of the bonus games. It should further be appreciated that the gaming device may enable the player to re-gain or accept a previously unaccepted bonus award in one, a plurality or all of the bonus games. In one embodiment, the gaming device displays or otherwise provides to a player, a message or other indication of the optimal bonus award, optimal play or optimal strategy in one or more of the bonus games.

Figure 6B:
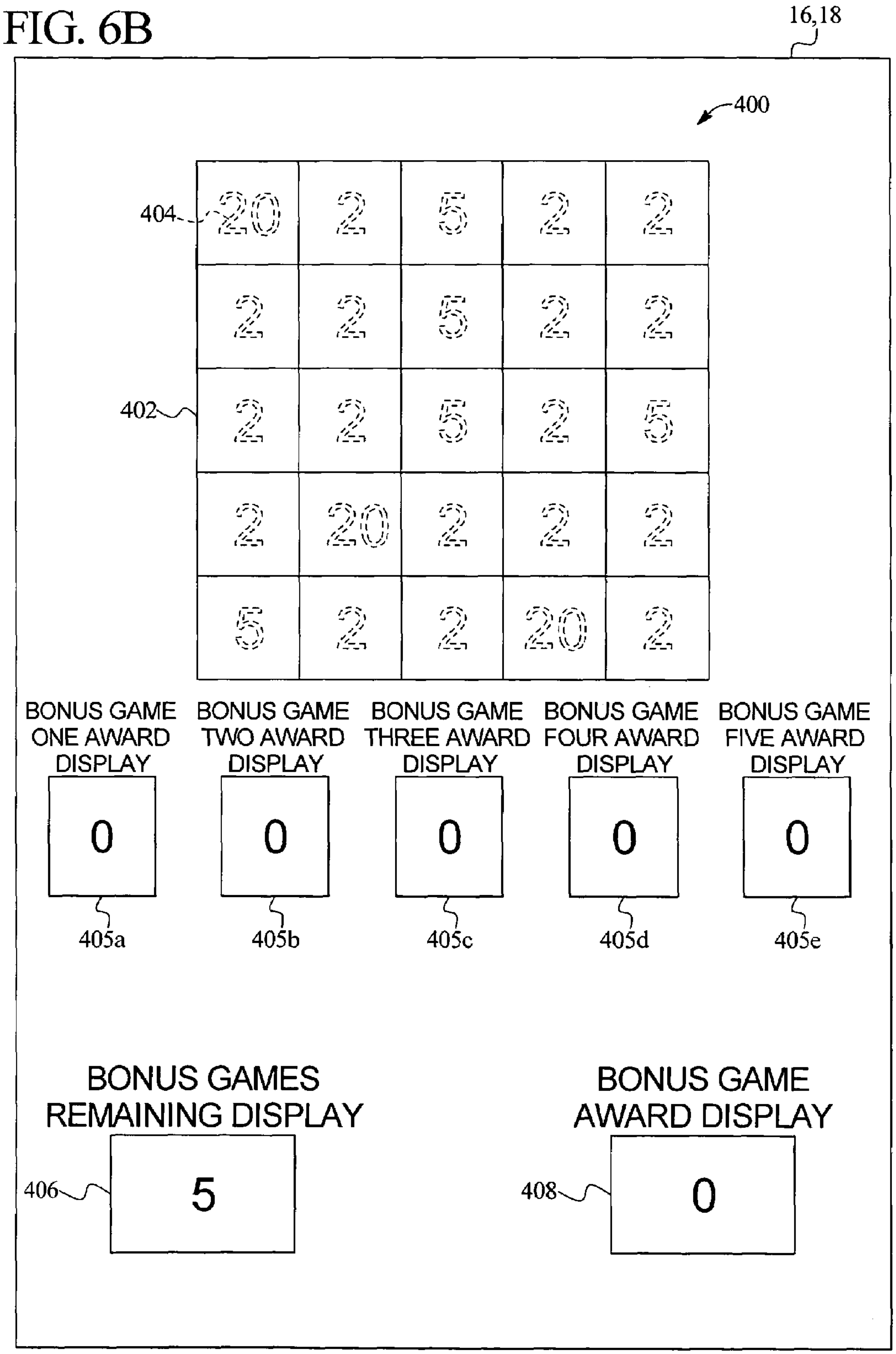
FIG. 6B is an enlarged elevation view of one embodiment of a bonus game initiated when a designated number of the activated scatter symbols of FIG. 6A are displayed in a play of the game.

As shown in FIG. 6B, the player has five bonus games, five payouts or five plays of the bonus game as indicated by the bonus games remaining display 406. Additionally, the award provided to the player in each of the bonus games is displayed or indicated by the bonus game award displays 405*a*, 405*b*, 405*c*, 405*d* and 405*e*, respectively. A bonus game award display 408 indicates the total award or total accumulation of the awards from each of the bonus games. It should be appreciated that the number of bonus award displays corresponds to the number of bonus games or plays of a bonus game provided to the player. For example, seven bonus award displays 405 are displayed to a player if the player obtained seven bonus games or seven plays of a bonus game. It should also be appreciated that any suitable number of award displays may be displayed to a player in the bonus game or bonus games.

Figure 6C:
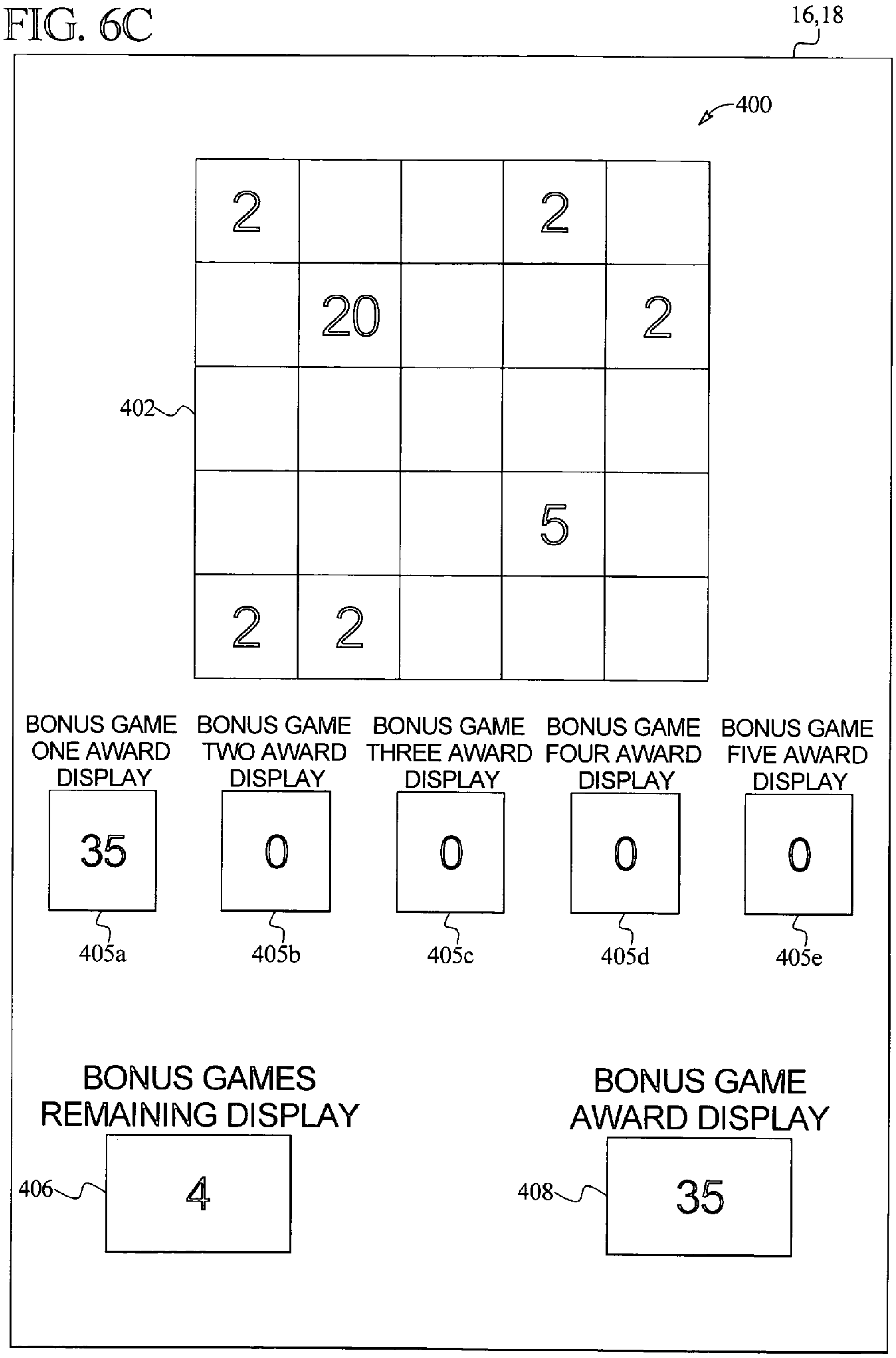
FIGS. 6C, 6D, 6E, 6F and 6G are enlarged elevation views of examples of the bonus game of FIG. 6B initiated when the designated number of the scatter symbols are displayed in the play of the game.

Referring now to FIG. 6C, the gaming device randomly generates an award or bonus payout of thirty-five in the first bonus game. The bonus award of thirty-five is provided to the player as indicated by the bonus game one award display 405*a*. The bonus award is added to the player's total award to give the player a total award of thirty-five as indicated by the bonus game award display 408. The gaming device now enables the player to accept this award or bonus payout for the next bonus game by pressing an input such as a button or other suitable input device or method (not shown). There are four bonus games or plays of the bonus game remaining as indicated by the bonus games remaining display 406.

Figure 6D:
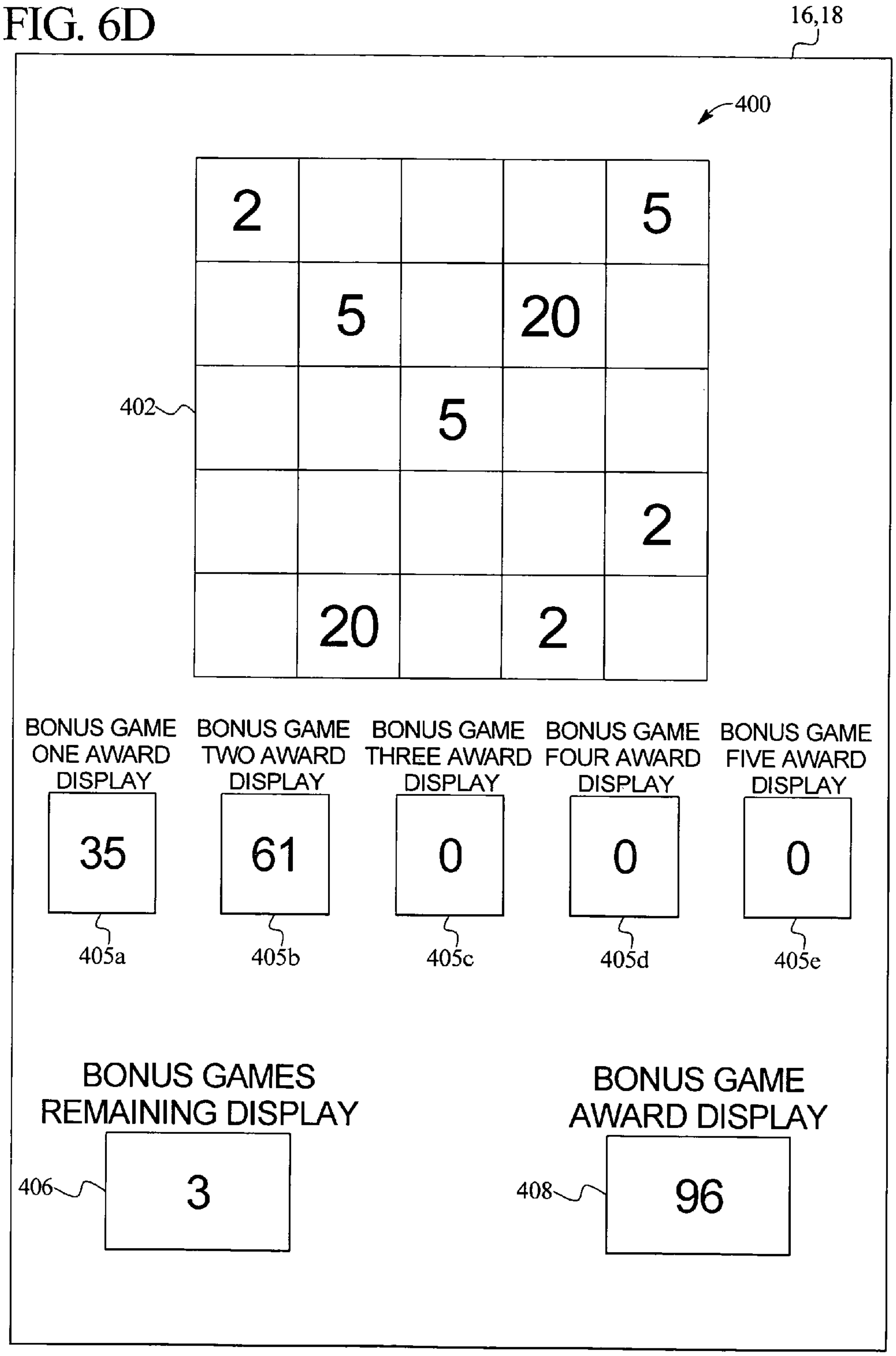

Referring now to FIG. 6D, the player does not accept the award of thirty-five generated in the first bonus game shown in FIG. 6C. The gaming device therefore randomly generates a new bonus award to provide to the player in the second bonus game. The gaming device randomly generates an award of sixty-one which is provided to the player as indicated by bonus game two award display 405*b*. The player's total award is now ninety-six based on the awards obtained from bonus games one and two as indicated by the bonus game award display 408. The gaming device enables the player to accept the award of sixty-one in the next bonus game. There are three bonus games remaining as indicated by the bonus games remaining display 406.

Figure 6E:
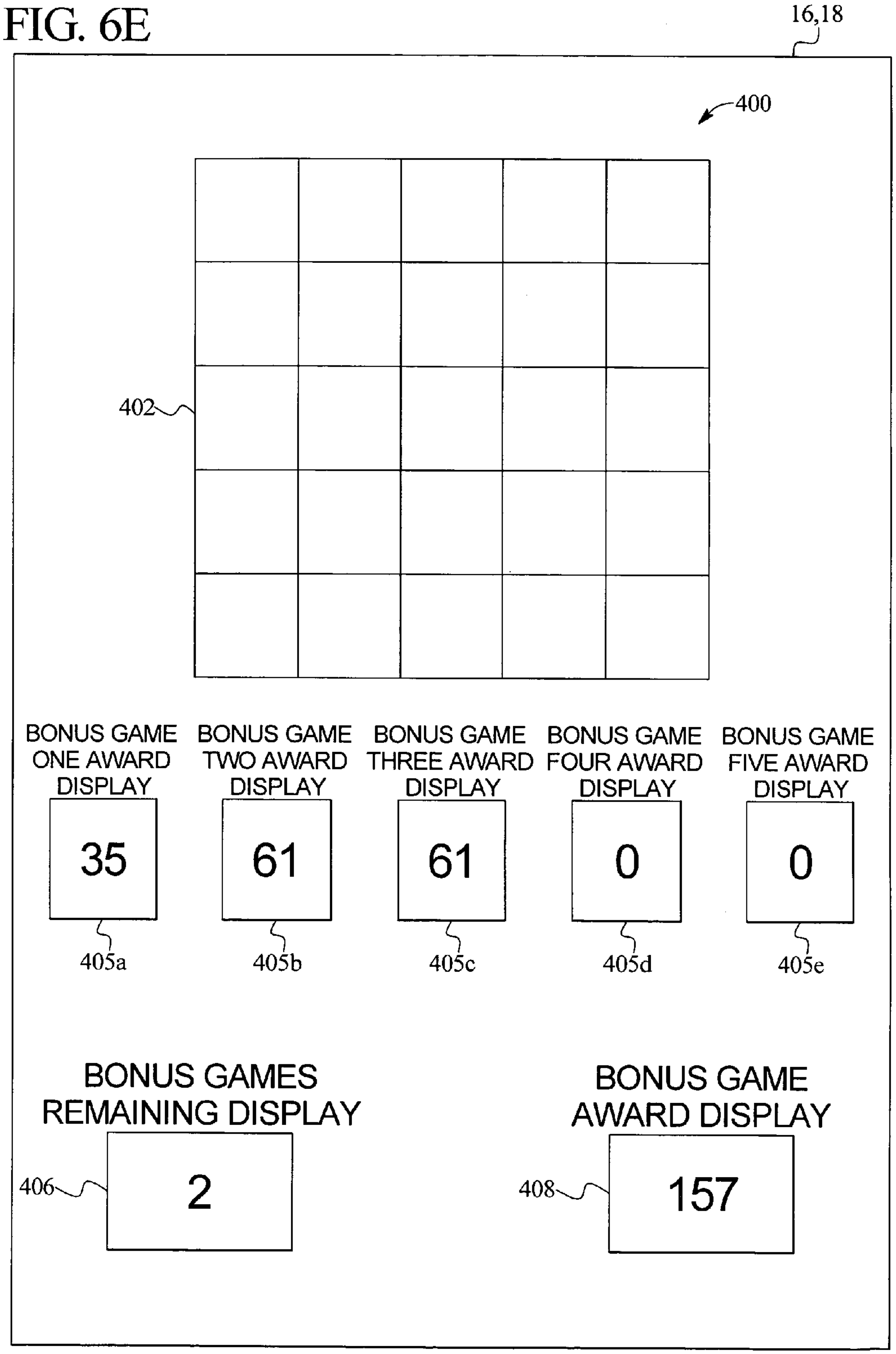

Referring now to FIG. 6E, the player accepts the award of sixty-one obtained in the second bonus game as the award or bonus payout for the third bonus game. The gaming device therefore provides the award of sixty-one to the player in the third bonus game as indicated by the bonus game three award display 405*c*. The player's total award is now one hundred fifty-seven as indicated by the bonus game award display 408. The gaming device enables the player to accept the bonus award again for the next bonus game. There are two bonus games remaining as indicated by the bonus games remaining display 406.

Figure 6F:
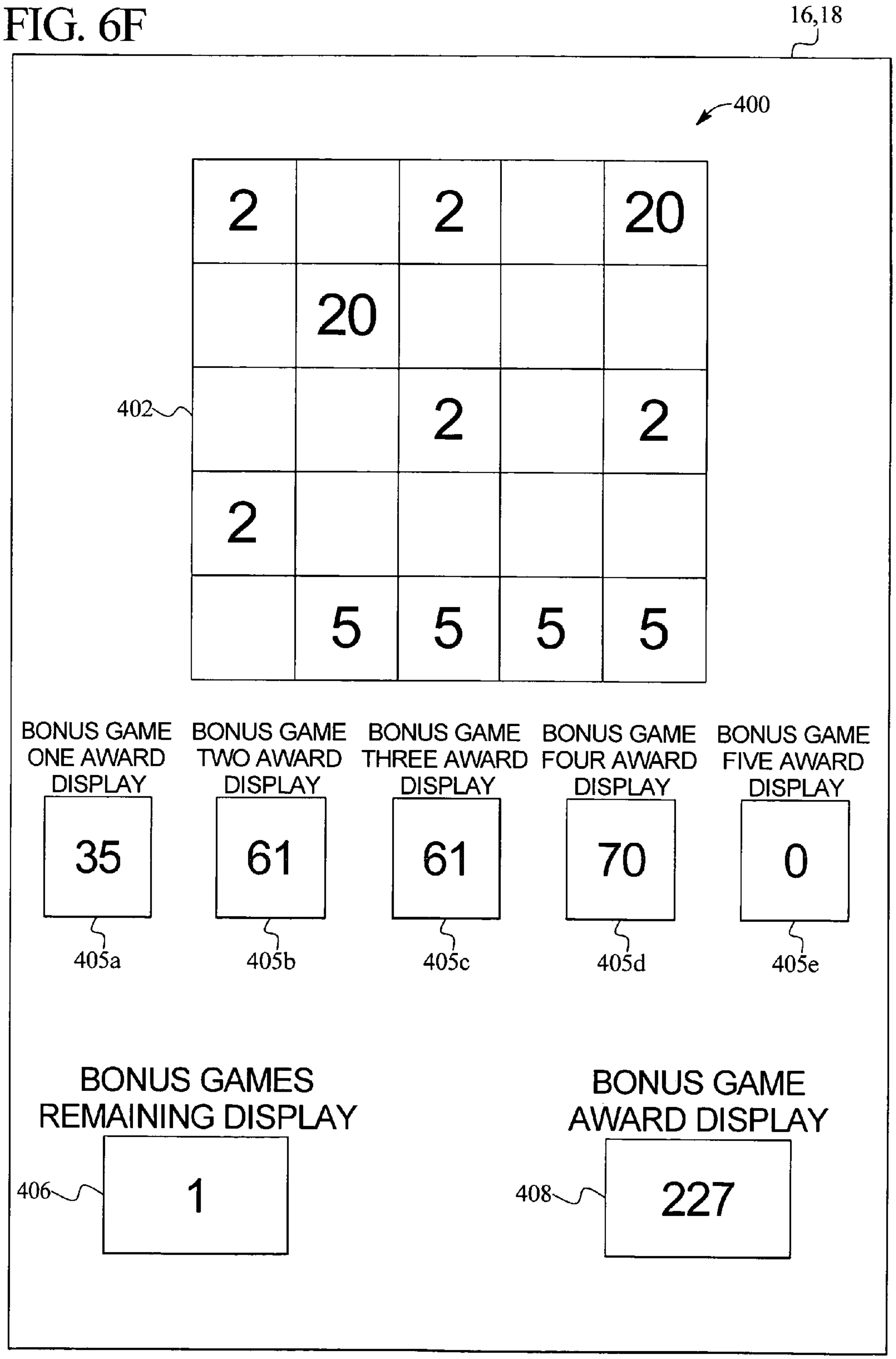

Referring now to FIG. 6F, the player does not accept the award of sixty-one for the fourth bonus game. The gaming device therefore randomly generates an award of seventy and provides this award to the player as indicated by the bonus game four award display 405*d*. The player now has a total award of two hundred twenty-seven as indicated by the bonus game award display 408. The gaming device enables the player to accept the bonus award for the next bonus game. There is one bonus game remaining as indicated by the bonus games remaining display 406.

Figure 6G:
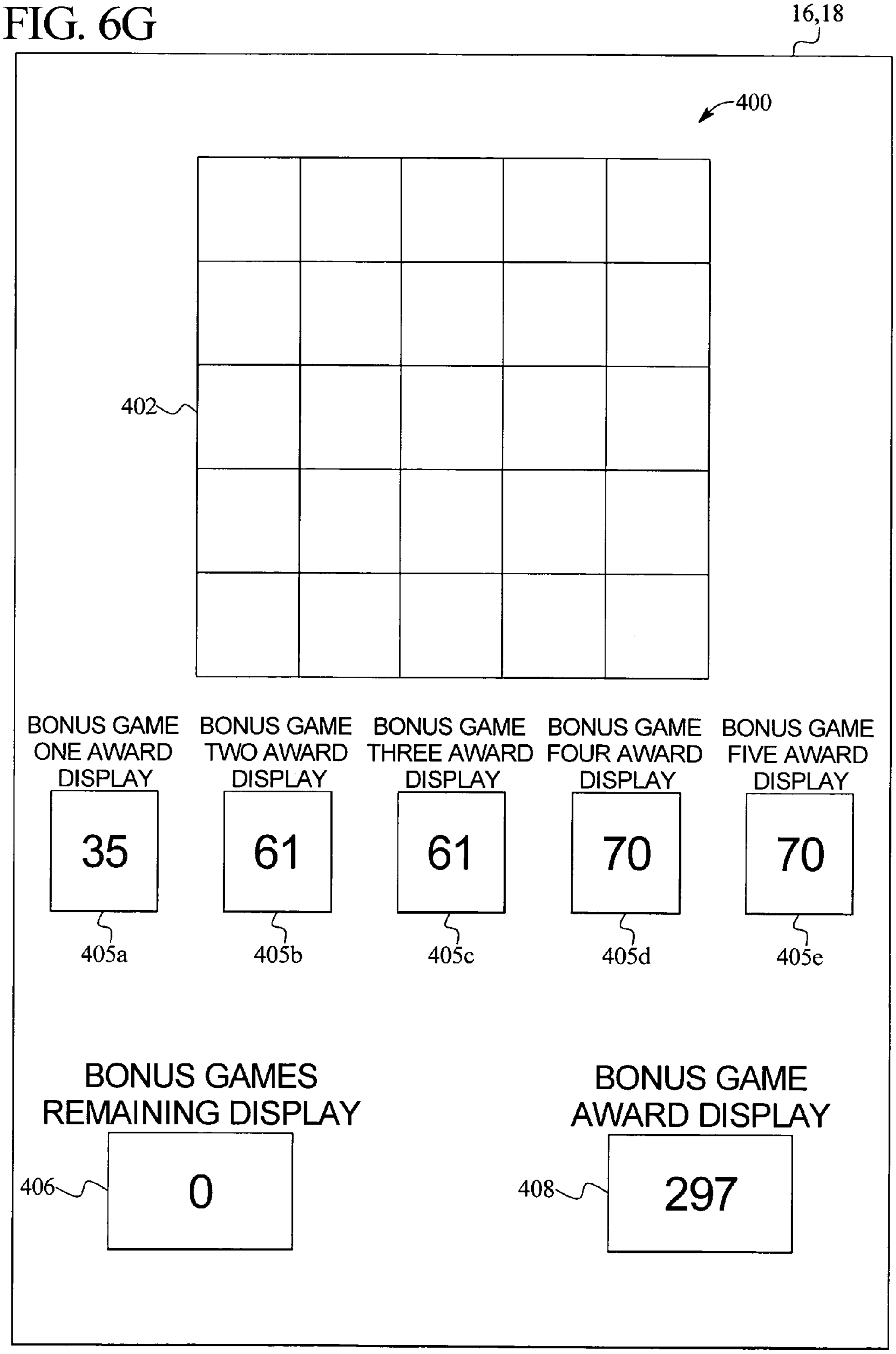

Referring now to FIG. 6G, the player accepts the award of seventy obtained in the fourth bonus game as the award or bonus payout for the fifth and last bonus game because the award of seventy is a relatively large award. The gaming device therefore provides the award of seventy to the player in the fifth bonus game as indicated by the bonus game five award display 405*e*. The player's total award is now two hundred ninety-seven as indicated by the bonus game award display 408. There are no bonus games remaining as indicated by the bonus games remaining display 406. The gaming device provides the total award for the bonus games of two hundred ninety-seven to the player and returns the player to the primary or initial game.

As described above, the scatter symbol increases a player's excitement and enjoyment of the game because it provides players with more opportunities to obtain awards in the game and potentially a relatively large award in the game.

In another embodiment, the gaming device provides a progressive award to a player in a play of the game when a designated symbol such as the wild symbol appears or is displayed along each of the diagonals in the matrix and the player wagers the maximum wager in the game as shown in FIG. 3A (i.e., the twenty credit wager is the maximum wager and purchases, activates or provides an opportunity to obtain the progressive jackpot payout). It should be appreciated that any suitable wager may be employed in the game to purchase or activate the opportunity to obtain the progressive jackpot in a game. The progressive award is an award which progressively increases during a plurality of plays of the game. If the player obtains the wild symbol along each of the diagonals in the matrix, the gaming device provides the progressive award to the player. It should be appreciated that the progressive award may be provided to the player for any suitable combination of the symbols in the game or for any suitable configuration of the symbol such as along one or more of the diagonals, in one or more of the rows or in one or more of the columns in the game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device operated under the control of a processor, said gaming device comprising:

at least one input device;

a symbol display associated with a primary game controlled by the processor; and wherein the processor is configured to operate with the symbol display and the at least one input device for each play of the primary game to:

(a) enable a player to wager one of:

(i) a first wagerable amount associated with a first group of designated symbols from a plurality of different activatable symbols, said first group including at least two designated symbols, and (ii) a second wagerable amount associated with a second group of designated symbols from the plurality of different activatable symbols, wherein the second wagerable amount is greater than the first wagerable amount, at least one of the designated symbols from the second group is different from each of the designated symbols from the first group, the second group has a greater number of designated symbols than the first group, and the plurality of activatable symbols includes at least one scatter symbol;

(b) if the player wagers the first wagerable amount, activate each designated symbol of the first group of the plurality of activatable symbols;

(c) if the player wagers the second wagerable amount, activate each designated symbol of the second group of the plurality of activatable symbols;

(d) for each one of a designated number of symbol display positions, generate and display a randomly determined one of the activatable symbols at said symbol display position regardless of whether said symbol is any one of said activated symbols;

(e) if the player wagers the first wagerable amount or the second wagerable amount, for each activated designated symbol, determine if any winning symbol combinations of said designated symbol are generated and displayed at the designated number of symbol display positions, wherein each and every winning symbol combination of said designated symbol must include at least a predetermined number of said designated symbols displayed at adjacent positions of the designated number of symbol display positions, the predetermined number being at least two, and wherein each and every occurrence of the predetermined number of said designated symbol displayed at adjacent positions is a winning symbol combination;

(f) determine if any scatter symbols are generated;

(g) if a designated number of scatter symbols is generated, provide a number of the bonus games to the player based on the number of generated scatter symbols; and (h) provide any awards to the player based on any determined winning symbol combinations and any provided bonus games.

2. The gaming device of claim 1, wherein the number of bonus games provided to the player is equal to a number of all of the generated scatter symbols.

3. The gaming device of claim 1, wherein each of the generated activatable symbols is displayed in a matrix.

4. The gaming device of claim 1, wherein the symbol display includes a plurality of symbol generators.

5. The gaming device of claim 4, wherein at least one of the symbol generators includes a reel.

6. The gaming device of claim 1, wherein the symbol display includes a plurality of independent reels.

7. The gaming device of claim 1, wherein the plurality of activatable symbols includes at least one wild symbol.

8. The gaming device of claim 1, wherein at least one of the winning activated symbol combinations includes a plurality of different activated symbols.

9. The gaming device of claim 1, wherein the plurality of activatable symbols includes a plurality of scatter symbols.

10. The gaming device of claim 1, wherein the number of bonus games provided to the player is based on a number of generated scatter symbols associated with a wagerable amount wagered by the player.

11. A method of operating a gaming device, said method comprising for each play of a primary game:

(a) enabling a player to wager one of:

(i) a first wagerable amount associated with a first group of designated symbols from a plurality of different activatable symbols, said first group including at least two designated symbols and (ii) a second wagerable amount associated with a second group of designated symbols from the plurality of different activatable symbols, wherein the second wagerable amount is greater than the first wagerable amount, at least one of the designated symbols from the second group is different from each of the designated symbols from the first group, the second group has a greater number of designated symbols than the first group, and the plurality of activatable symbols includes at least one scatter symbol;

(b) receiving a wager from the player for one of the first wagerable amount and the second wagerable amount, and:

(i) if the player wagers the first wagerable amount, activating each designated symbol of the first group of the plurality of activatable symbols;

(ii) if the player wagers the second wagerable amount, activating each designated symbol of the second group of the plurality of activatable symbols;

(c) generating a plurality of the activatable symbols;

(d) for each one of a designated number of symbol display positions, causing a display device to display a randomly determined one of said generated activated symbols at said symbol display position regardless of whether said symbol is any one of said activated symbols;

(e) regardless of whether the player wagers the first wagerable amount or the second wagerable amount, for each activated designated symbol, determining if any winning symbol combinations of said designated symbol are generated and displayed at the designated number of symbol display positions, wherein each and every winning symbol combination of said designated symbol must include at least a predetermined number of said designated symbols displayed at adjacent positions of the designated number of symbol display positions, the predetermined number being at least two, and wherein each and every occurrence of the predetermined number of said designated symbol displayed at adjacent positions is a winning symbol combination;

(f) determining if any scatter symbols are generated;

(g) if a designated number of scatter symbols is generated, providing a number of bonus games to the player from a plurality of bonus games, wherein the number of bonus games is based on the number of generated scatter symbols; and (h) providing any awards to the player based on any determined activated symbol combinations and any provided bonus games.

12. The method of claim 11, wherein the number of bonus games provided to the player is equal to a number of all of the generated scatter symbols.

13. The method of claim 11, which includes causing the display device to display each of the generated activatable symbols in a matrix.

14. The method of claim 11, wherein the displayed activatable symbols are displayed by a plurality of symbol generators.

15. The method of claim 14, wherein at least one of the symbol generators includes a reel.

16. The method of claim 14, wherein at least one of the symbol generators includes a plurality of independent reels.

17. The method of claim 11, wherein the plurality of activatable symbols includes at least one wild symbol.

18. The method of claim 11, wherein at least one of the winning activated symbol combinations includes a plurality of different activated symbols.

19. The method of claim 11, wherein the plurality of activatable symbols includes a plurality of scatter symbols.

20. The method of claim 11, wherein the number of bonus games provided to the player is based on the number of generated scatter symbols associated with a wagerable amount wagered by the player.

21. The method of claim 11, which is provided through a data network.

22. The method of claim 21, wherein the data network is the internet.

23. A gaming device operated under the control of a processor, said gaming device comprising:

at least one input device; and a matrix associated with a primary game controlled by the processor, said matrix including a designated number of symbol display positions defined by a plurality of symbol generators;

wherein the processor is configured to operate with the symbol generators and the at least one input device for each play of the primary game to:

(a) enable a player to wager any one of a plurality of different wagerable amounts, wherein each of the plurality of different wagerable amounts is associated with a different one of a plurality of symbol sets, each of the plurality of symbol sets includes a different plurality of designated symbols from a plurality of activatable symbols, and at least one of the plurality of symbol sets includes a greater number of designated symbols than a different one of the plurality of symbol sets;

(b) if the player wagers one of the plurality of different wagerable amounts, activate each designated symbol of the symbol set associated with said one of the plurality of different wagerable amounts wagered by the player;

(c) cause a plurality of the symbol generators to display a randomly determined one of the activatable symbols at each symbol display position of the designated number of symbol display positions of the matrix regardless of whether said symbol is any one of said activated symbols;

(d) if the player wagers one or more of the wagerable amounts, regardless of which of the wagerable amounts the player wagers, for each activated designated symbol, evaluate the symbols displayed at the designated number of symbol display positions of the matrix for any of a plurality of winning symbol combinations of said designated symbol, wherein each and every one of said plurality of winning symbol combinations of said designated symbol must include at least a predetermined number of said designated symbols displayed at adjacent positions of the designated number of symbol display positions of the matrix, the predetermined number being at least two, and wherein each and every occurrence of the predetermined number of said designated symbol displayed at adjacent positions is a winning symbol combination; and (e) provide an award to the player for any displayed winning symbol combinations.

24. The gaming device of claim 23, wherein the plurality of activatable symbols includes at least one wild symbol.

25. The gaming device of claim 23, wherein the plurality of activatable symbols includes at least one scatter symbol.

26. The gaming device of claim 23, wherein at least one of the symbol generators includes a reel.

27. The gaming device of claim 23, wherein at least one of the symbol generators includes a plurality of independent reels.

28. The gaming device of claim 23, wherein at least one of the winning activated symbol combinations includes a plurality of different activated symbols.

29. The gaming device of claim 23, wherein a plurality of the symbol sets include a different number of designated symbols from the plurality of different activatable symbols.

30. The gaming device of claim 23, wherein the processor is configured to operate with the symbol generators and the at least one input device to: (a) activate each symbol of a first symbol set if the player wagers a first wagerable amount associated with said first symbol set, and (b) activate each symbol of a second symbol set if the player wagers a second greater wagerable amount associated with said second symbol set, wherein said second symbol set includes each of the symbols of said first symbol set and at least one additional symbol.

31. The gaming device of claim 23, wherein each symbol of at least one generated winning symbol combination must be displayed at symbols display positions arranged along a straight line.

32. A method of operating a gaming device, said gaming device including a primary game, a plurality of different wagerable amounts in the primary game, a plurality of different symbol sets in the primary game, a plurality of said symbol sets each including a different plurality of designated symbols from a plurality of different activatable symbols, wherein each one of the symbol sets is associated with a different one of said different wagerable amounts, and at least one of the symbol sets includes a greater number of the activatable symbols than a different one of the symbol sets, said method comprising for each play of the primary game:

(a) enabling a player to wager any one of the plurality of different wagerable amounts;

(b) receiving a wager from the player for one of the plurality of different wagerable amounts and activating each designated symbols of the symbol set associated with said one of the plurality of different wagerable amounts;

(c) causing a display device to display a randomly determined one of the activatable symbols at each position of a designated number of symbol display positions of a matrix, regardless of whether said symbol is any one of said activated symbols;

(d) if the player wagers one of the wagerable amounts, regardless of which of the wagerable amounts the player wagers, for each activated designated symbol, evaluating the symbols displayed at the designated number of symbol display positions of the matrix for any of a plurality of winning symbol combinations, wherein each and every one of said plurality of winning symbol combinations of said designated symbol must include at least a predetermined number of said designated symbols displayed at adjacent positions of the designated number of symbol display positions of the matrix, the predetermined number being at least two, and wherein each and every occurrence of the predetermined number of said designated symbol displayed at adjacent positions is a winning symbol combination; and (e) providing an award to the player for any displayed winning activated symbol combinations.

33. The method of claim 32, wherein the plurality of activatable symbols includes at least one wild symbol.

34. The method of claim 32, wherein the plurality of activatable symbols includes at least one scatter symbol.

35. The method of claim 32, wherein the designated number of symbol display positions of the matrix are defined by a plurality of symbol generators.

36. The method of claim 35, wherein at least one of the symbol generators includes an independent reel.

37. The method of claim 32, wherein at least one of the winning activated symbol combinations includes a plurality of different activated symbols.

38. The method of claim 32, wherein a plurality of the symbol sets include a different number of the activatable symbols.

39. The method of claim 32, which includes: (a) activating each symbol of a first symbol set if the player wagers a first wagerable amount associated with said first symbol set, and (b) activating each symbol of a second symbol set if the player wagers a second greater wagerable amount associated with said second symbol set, wherein said second symbol set includes each of the symbols of said first symbol set and at least one additional symbol.

40. The method of claim 32, wherein each symbol of at least one of said winning symbol combinations must be displayed at symbols display positions arranged along a straight line.

41. The method of claim 32, which is provided through a data network.

42. The method of claim 41, wherein the data network is the internet.

43. The gaming device of claim 1, wherein the second group of designated symbols includes each symbol of the first group of designated symbols.

44. The gaming device of claim 1, wherein each symbol of the first group of designated symbols is different from each symbol of the second group of designated symbols.

45. The method of claim 11, wherein the second group of designated symbols includes each symbol of the first group of designated symbols.

46. The method of claim 11, wherein each symbol of the first group of designated symbols is different from each symbol of the second group of designated symbols.

* * * * *

UNITED STATES PATENT AND TRADEMARK OFFICE

CERTIFICATE OF CORRECTION

PATENT NO. : 7,585,219 B2
APPLICATION NO. : 11/214369
DATED : September 8, 2009
INVENTOR(S) : Randall et al.

It is certified that error appears in the above-identified patent and that said Letters Patent is hereby corrected as shown below:

IN THE CLAIMS:

In Claim 11, Column 23, line 32, insert --;-- after "symbols".

Signed and Sealed this

Twentieth Day of July, 2010

David J. Kappos

*Director of the United States Patent and Trademark Office*

UNITED STATES PATENT AND TRADEMARK OFFICE

CERTIFICATE OF CORRECTION

PATENT NO. : 7,585,219 B2
APPLICATION NO. : 11/214369
DATED : September 8, 2009
INVENTOR(S) : Randall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 271 days.

Signed and Sealed this

Fourteenth Day of September, 2010

David J. Kappos
*Director of the United States Patent and Trademark Office*